(12) United States Patent
Liu et al.

(10) Patent No.: US 12,713,327 B2
(45) Date of Patent: Aug. 18, 2026

(54) ACCESS CONTROL METHOD AND APPARATUS, AND COMMUNICATION SYSTEM

(71) Applicant: HUAWEI TECHNOLOGIES CO., LTD., Shenzhen (CN)

(72) Inventors: Hang Liu, Beijing (CN); Xingxin Zhang, Chengdu (CN); Changqing Yang, Beijing (CN)

(73) Assignee: Huawei Technologies Co., LTD., Shenzhen (CN)

( * ) Notice: Subject to any disclaimer, the term of this patent is extended or adjusted under 35 U.S.C. 154(b) by 663 days.

(21) Appl. No.: 17/950,532

(22) Filed: Sep. 22, 2022

(65) Prior Publication Data

US 2023/0014413 A1 Jan. 19, 2023

Related U.S. Application Data

(63) Continuation of application No. PCT/CN2020/080672, filed on Mar. 23, 2020.

(51) Int. Cl.

*H04W 48/02* (2009.01)
*H04W 4/48* (2018.01)
*H04W 74/0833* (2024.01)

(52) U.S. Cl.

CPC ............. *H04W 48/02* (2013.01); *H04W 4/48* (2018.02); *H04W 74/0833* (2013.01)

(58) Field of Classification Search

CPC ....... H04W 48/02; H04W 4/48; H04W 48/12; H04W 74/0833; H04W 84/12; H04W 48/08

See application file for complete search history.

(56) References Cited

U.S. PATENT DOCUMENTS 9,875,589 B1 * 1/2018 Buttolo .............. G07C 9/00571
2012/0039171 A1 * 2/2012 Yamada .................. H04L 47/24 370/232

(Continued)

FOREIGN PATENT DOCUMENTS

CN 108496381 A 9/2018
CN 109257794 A 1/2019

(Continued)

OTHER PUBLICATIONS

Office Action in Japanese Appln. No. 2022-558282, mailed on Aug. 21, 2023, 15 pages (with English translation).

(Continued)

*Primary Examiner* — Tejis Daya
(74) *Attorney, Agent, or Firm* — Fish & Richardson P.C.

(57) ABSTRACT

This application relates to an access control method, applied to the field of short-range communication, for example, cockpit domain communication. An example method includes: determining that a status of a first device is a first status; and sending first indication information, where the first indication information indicates whether access of at least one second device to the first device is allowed. A system broadcast message carrying system status information is sent, so that after a non-vehicle-mounted device receives the system broadcast message, the non-vehicle-mounted device determines, based on the system status information, whether to initiate a random access request.

30 Claims, 6 Drawing Sheets

Receive first indication information from a first device — S601

↓

Determine, based on the first indication information, whether access of a second device to the first device is allowed — S602

(56) References Cited

U.S. PATENT DOCUMENTS

| | | | | |
|---|---|---|---|---|
| 2013/0242955 | A1* | 9/2013 | Fan | H04W 72/0446 370/336 |
| 2015/0282072 | A1 | 10/2015 | Glik et al. | |
| 2016/0057692 | A1* | 2/2016 | Geng | H04W 48/02 370/329 |
| 2016/0323287 | A1 | 11/2016 | Kishikawa et al. | |
| 2017/0181030 | A1* | 6/2017 | Han | H04L 43/0882 |
| 2018/0124680 | A1* | 5/2018 | Dhanda | H04L 12/00 |
| 2019/0313473 | A1* | 10/2019 | Kim | H04W 48/02 |
| 2020/0259919 | A1* | 8/2020 | Lepp | H04W 4/44 |
| 2021/0105619 | A1* | 4/2021 | Kashani | G10L 15/25 |

FOREIGN PATENT DOCUMENTS

| | | | | |
|---|---|---|---|---|
| CN | 209821620 | U | 12/2019 | |
| CN | 110892739 | A | 3/2020 | |
| EP | 3567927 | A1 | 11/2019 | |
| JP | 2016195448 | A | 11/2016 | |
| WO | 0225970 | A1 | 3/2002 | |
| WO | WO-2016141528 | A1 * | 9/2016 | H04W 36/26 |
| WO | 2018118352 | A1 | 6/2018 | |
| WO | 2018184512 | A1 | 10/2018 | |
| WO | 2018203263 | A1 | 11/2018 | |
| WO | 2018236196 | A1 | 12/2018 | |
| WO | 2020030163 | A1 | 2/2020 | |

OTHER PUBLICATIONS

Office Action in Chinese Appln. No. 202080098914.X, dated Apr. 15, 2023, 9 pages.

Extended European Search Report in European Appln No. 20927131.1, dated Apr. 17, 2023, 8 pages.

Office Action in Indian Appln. No. 202237057805, dated Feb. 13, 2023, 6 pages (with English translation).

International Search Report and Written Opinion in International Appln. No. PCT/CN2020/080672, mailed on Nov. 26, 2020, 15 pages (with English translation).

* cited by examiner

ACCESS CONTROL METHOD AND APPARATUS, AND COMMUNICATION SYSTEM

CROSS-REFERENCE TO RELATED APPLICATIONS

This application is a continuation of International Application No. PCT/CN2020/080672, filed on Mar. 23, 2020, the disclosure of which is hereby incorporated by reference in its entirety.

TECHNICAL FIELD

This application relates to the communication field, and in particular, to a differentiated access control method and apparatus, and a communication device, which are specifically used for short-range communication, for example, cockpit domain communication.

BACKGROUND

Short-range communication technologies, for example, Bluetooth and Wi-Fi, play a very important role in people's daily life. As vehicles are increasingly used and more popularized, functions of short-range communication technologies become more prominent. With the development of science and technology, an advanced driving assistance system (advanced driving assistance system, ADAS) and an automated driving system (automated driving system. ADS) of the vehicles evolve continuously. In the future, vehicle driving is very likely to be implemented by a machine, so that people do not need to use hands and feet to drive. In addition to being a transportation device for users, the vehicle is one of living spaces for daily life. By using a smart cockpit technology, a large quantity of functions can be provided for people in the vehicle, for example, abundant entertainment activities, audio and video playing, and an office environment. As a result, people can work in the vehicle, enjoy customized audio and video entertainment services, have customized driving experience, and the like.

Currently, the smart cockpit mainly includes a cockpit domain controller (cockpit domain controller, CDC), vehicle-mounted devices, and non-vehicle-mounted devices. The CDC is connected to the vehicle-mounted devices mainly in a wired manner, and the CDC is connected to the non-vehicle-mounted devices mainly in a wireless manner. However, because the CDC is connected to the vehicle-mounted devices in a wired manner, a large quantity of cables are required in this manner, and therefore, costs are high. For narrow space inside the vehicle, as a quantity of vehicle-mounted devices increases, cabling becomes difficult. Cabling and high costs of cables become constraints of the development of the smart cockpit technology. Therefore, to connect the CDC and the vehicle-mounted devices or the non-vehicle-mounted devices in a wireless manner becomes an urgent issue to be resolved.

SUMMARY

Embodiments of this application provide an access control method, applied to the universal transmission field. An information element carrying system status information or access indication information is sent to indicate a current system state, so that after receiving the foregoing information, a non-vehicle-mounted device determines whether to initiate a random access request. Access of the non-vehicle-mounted device is limited in a specific phase. This avoids impact, caused by random access request initiation performed by the non-vehicle-mounted device in this phase, on checking a status of a vehicle-mounted device by a CDC and access of the vehicle-mounted device. This also ensures that the vehicle-mounted device can run normally and some basic services can be run normally.

According to a first aspect, this application provides an access control method. The method includes: determining that a status of a first device is a first status; and sending first indication information, where the first indication information is used to indicate whether access of at least one second device to the first device is allowed. Optionally, the first indication information is carried in a system message or is sent by broadcasting. The first indication information may be a master information block (master information block, MIB), a system information block (system information block, SIB), or a broadcast frame (broadcast frame). The MIB may be carried on a physical broadcast channel (physical broadcast channel, PBCH). The SIB is usually included in radio resource control (radio resource control, RRC) signaling. Optionally, the first indication information is sent by broadcasting.

In a possible implementation, the first status includes at least one of a system preparation state and a vehicle-mounted device accessing state, and the first indication information is used to indicate that access of the at least one second device is not allowed; or the first status includes at least one of a system running state and an access allowed state, and the first indication information is used to indicate that access of the second device is allowed. The system preparation state and/or the vehicle-mounted device accessing state may be used to indicate that the vehicle-mounted device is accessing a control domain cockpit CDC, or the vehicle-mounted device is performing self-check, so that a non-vehicle-mounted device chooses, based on these types of system states, not to access the control domain cockpit CDC. The system running state and/or the access allowed state may be used to indicate that the vehicle-mounted device has accessed the control domain cockpit CDC. In this case, the non-vehicle-mounted device may be allowed to access the control domain cockpit CDC.

In a possible implementation, the first indication information is used to indicate whether access of at least one third device is allowed.

In a possible implementation, the first indication information includes device type information, and a device type of the at least one second device belongs to at least one device type indicated by the device type information. Further, the second device determines, based on the device type information, whether to access the first device.

In a possible implementation, the first indication information further includes access indication information, and the access indication information is used to indicate whether access to the first device is allowed.

In a possible implementation, the first indication information includes priority information, and a priority of the at least one second device belongs to at least one priority indicated by the priority information.

In a possible implementation, the first indication information further includes access indication information, and the access indication information is used to indicate whether access to the first device is allowed. Further, the second device determines, based on the priority information and the access indication information, whether to access the first device.

In a possible implementation, the first indication information includes first time information, and the first time information is used to indicate that access of the at least one second device to the first device is not allowed within a first time range.

In a possible implementation, the first time range is a time domain offset relative to a first reference frame or a time domain offset relative to first signaling. The first reference frame may be a first system frame number agreed or negotiated in advance between the control domain cockpit CDC and the non-vehicle-mounted device, or may be a first system frame number defined in protocols. The first signaling may be specific signaling agreed or negotiated in advance between the control domain cockpit CDC and the non-vehicle-mounted device, or may be specific signaling defined in the protocols. For example, the first signaling may be RRC signaling. There may be one or more time domain offsets.

In a possible implementation, the first indication information includes resource indication information, and the resource indication information indicates a resource used for the at least one third device; or the resource indicated by the resource indication information is not used for the at least one second device.

In a possible implementation, there is a correspondence between the resource indicated by the resource indication information and a device type and/or a priority of the at least one third device.

In a possible implementation, the first indication information includes a Boolean variable or an enumeration variable. Certainly, alternatively, a variable of any other equivalent type may be included.

In a possible implementation, the device type includes at least one of vehicle-mounted device and non-vehicle-mounted device.

According to a second aspect, this application provides an access method. The method includes: receiving first indication information from a first device; and determining, based on the first indication information, whether access of a second device to the first device is allowed. Optionally, the first indication information is carried in a system message or may be sent by broadcasting. For example, the system message may be a system broadcast message. The first indication information may be a MIB, a SIB, or a broadcast frame. The MIB may be carried on a PBCH. The SIB is usually included in RRC signaling.

In a possible implementation, the first indication information is used to indicate whether access of at least one third device is allowed.

In a possible implementation, the first indication information includes device type information, and a device type of at least one second device belongs to at least one device type indicated by the device type information. Further, the second device determines, based on the device type information, whether to access the first device.

In a possible implementation, the first indication information further includes access indication information, and the access indication information is used to indicate whether access to the first device is allowed.

In a possible implementation, the first indication information includes priority information, and a priority of the at least one second device belongs to at least one priority indicated by the priority information.

In a possible implementation, the first indication information further includes access indication information, and the access indication information is used to indicate whether access to the first device is allowed. Further, the second device determines, based on the priority information and the access indication information, whether to access the first device.

In a possible implementation, the first indication information includes first time information, and the first time information is used to indicate that access of the at least one second device to the first device is not allowed within a first time range.

In a possible implementation, the first time range is a time domain offset relative to a first reference frame or a time domain offset relative to first signaling. The first reference frame may be a first system frame number agreed or negotiated in advance between a control domain cockpit CDC and a non-vehicle-mounted device, or may be a first system frame number defined in protocols. The first signaling may be specific signaling agreed or negotiated in advance between the control domain cockpit CDC and the non-vehicle-mounted device, or may be specific signaling defined in the protocols. For example, the first signaling may be RRC signaling. There may be one or more time domain offsets.

In a possible implementation, the first indication information includes resource indication information, and the resource indication information indicates a resource used for the at least one third device, or the resource indicated by the resource indication information is not used for the at least one second device.

In a possible implementation, there is a correspondence between the resource indicated by the resource indication information and a device type and/or a priority of the at least one third device.

In a possible implementation, the first indication information includes a Boolean variable or an enumeration variable. Certainly, alternatively, a variable of any other equivalent type may be included.

In a possible implementation, the CDC is also referred to as control domain cockpit or control domain cockpit CDC, the first device is the control domain cockpit CDC, the third device is a vehicle-mounted device, and the second device is the non-vehicle-mounted device.

In a possible implementation, the second device is a mobile phone.

According to a third aspect, this application provides an access control apparatus. The access control apparatus may be a first device, or may be a chip or an integrated circuit in the first device. For example, the access control apparatus is a control domain cockpit CDC, or the access control apparatus is a chip or an integrated circuit in the control domain cockpit CDC. Certainly, the access control apparatus may alternatively be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence. AI) device, a wearable device, a vehicle-mounted device, a smart home device, and/or a smart city device. A specific type of the first device is not limited in this embodiment of this application. The apparatus includes: a processing unit, configured to determine that a status of the first device is a first status; and a sending unit, configured to send first indication information, where the first indication information is used to indicate whether access of at least one second device to the first device is allowed. Optionally, the first indication information is carried in a system message or is sent by broadcasting. The first indication information may be a MIB, a SIB, or a broadcast frame (broadcast frame). The MIB may be carried on a PBCH. The SIB is usually included in RRC signaling. Optionally, the first indication information is sent by broadcasting.

In a possible implementation, the first status includes at least one of a system preparation state and a vehicle-mounted device accessing state, and the first indication information is used to indicate that access of the at least one second device is not allowed; or the first status includes at least one of a system running state and an access allowed state, and the first indication information is used to indicate that access of the second device is allowed. The system preparation state and/or the vehicle-mounted device accessing state may be used to indicate that a vehicle-mounted device is accessing a control domain cockpit CDC, or the vehicle-mounted device is performing self-check, so that a non-vehicle-mounted device chooses, based on these types of system states, not to access the control domain cockpit CDC. The system running state and/or the access allowed state may be used to indicate that the vehicle-mounted device has accessed the control domain cockpit CDC. In this case, the non-vehicle-mounted device may be allowed to access the control domain cockpit CDC.

In a possible implementation, the first indication information is used to indicate whether access of at least one third device is allowed.

In a possible implementation, the first indication information includes device type information, and a device type of the at least one second device belongs to at least one device type indicated by the device type information. Further, the second device determines, based on the device type information, whether to access the first device.

In a possible implementation, the first indication information further includes access indication information, and the access indication information is used to indicate whether access to the first device is allowed.

In a possible implementation, the first indication information includes priority information, and a priority of the at least one second device belongs to at least one priority indicated by the priority information.

In a possible implementation, the first indication information further includes access indication information, and the access indication information is used to indicate whether access to the first device is allowed. Further, the second device determines, based on the priority information and the access indication information, whether to access the first device.

In a possible implementation, the first indication information includes first time information, and the first time information is used to indicate that access of the at least one second device to the first device is not allowed within a first time range.

In a possible implementation, the first time range is a time domain offset relative to a first reference frame or a time domain offset relative to first signaling. The first reference frame may be a first system frame number agreed or negotiated in advance between the control domain cockpit CDC and the non-vehicle-mounted device, or may be a first system frame number defined in protocols. The first signaling may be specific signaling agreed or negotiated in advance between the control domain cockpit CDC and the non-vehicle-mounted device, or may be specific signaling defined in the protocols. For example, the first signaling may be RRC signaling. There may be one or more time domain offsets.

In a possible implementation, the first indication information includes resource indication information, and the resource indication information indicates a resource used for the at least one third device; or the resource indicated by the resource indication information is not used for the at least one second device.

In a possible implementation, there is a correspondence between the resource indicated by the resource indication information and a device type and/or a priority of the at least one third device.

In a possible implementation, the first indication information includes a Boolean variable or an enumeration variable. Certainly, alternatively, a variable of any other equivalent type may be included.

In a possible implementation, the device type includes at least one of vehicle-mounted device and non-vehicle-mounted device.

According to a fourth aspect, this application provides an access apparatus. The access apparatus may be a second device, or may be a chip or an integrated circuit in the second device. For example, the access apparatus is a chip or an integrated circuit in a vehicle-mounted device or a non-vehicle-mounted device. Certainly, the access apparatus may alternatively be a mobile phone, a tablet computer, a desktop computer, a laptop computer, a handheld computer, a notebook computer, a UMPC, a netbook, a cellular phone, a PDA, an AR device, a VR device, an AI device, a wearable device, a vehicle-mounted device, a smart home device, and/or a smart city device. A specific type of a first device is not limited in this embodiment of this application. The apparatus includes: a receiving unit and a processing unit. The receiving unit is configured to receive first indication information from the first device. The processing unit is configured to determine, based on the first indication information, whether access of the second device to the first device is allowed. Optionally, the first indication information is carried in a system message or may be sent by broadcasting. For example, the system message may be a system broadcast message. The first indication information may be a MIB, a SIB, or a broadcast frame. The MIB may be carried on a PBCH. The SIB is usually included in RRC signaling.

In a possible implementation, the first indication information is used to indicate whether access of at least one third device is allowed.

In a possible implementation, the first indication information includes device type information, and a device type of at least one second device belongs to at least one device type indicated by the device type information. Further, the second device determines, based on the device type information, whether to access the first device.

In a possible implementation, the first indication information further includes access indication information, and the access indication information is used to indicate whether access to the first device is allowed.

In a possible implementation, the first indication information includes priority information, and a priority of the at least one second device belongs to at least one priority indicated by the priority information.

In a possible implementation, the first indication information further includes access indication information, and the access indication information is used to indicate whether access to the first device is allowed. Further, the second device determines, based on the priority information and the access indication information, whether to access the first device.

In a possible implementation, the first indication information includes first time information, and the first time information is used to indicate that access of the at least one second device to the first device is not allowed within a first time range.

In a possible implementation, the first time range is a time domain offset relative to a first reference frame or a time domain offset relative to first signaling. The first reference frame may be a first system frame number agreed or negotiated in advance between a control domain cockpit CDC and a non-vehicle-mounted device, or may be a first system frame number defined in protocols. The first signaling may be specific signaling agreed or negotiated in advance between the control domain cockpit CDC and the non-vehicle-mounted device, or may be specific signaling defined in the protocols. For example, the first signaling may be RRC signaling. There may be one or more time domain offsets.

In a possible implementation, the first indication information includes resource indication information, and the resource indication information indicates a resource used for the at least one third device; or the resource indicated by the resource indication information is not used for the at least one second device.

In a possible implementation, there is a correspondence between the resource indicated by the resource indication information and a device type and/or a priority of the at least one third device.

In a possible implementation, the first indication information includes a Boolean variable or an enumeration variable. Certainly, alternatively, a variable of any other equivalent type may be included.

In a possible implementation, the first device is the control domain cockpit CDC, the third device is a vehicle-mounted device, and the second device is the non-vehicle-mounted device.

In a possible implementation, the second device is a mobile phone.

According to a fifth aspect, this application provides a computer storage medium, where the computer storage medium includes computer instructions. When the computer instructions are executed by at least one processor, the methods in the first aspect and the second aspect are implemented.

According to a sixth aspect, this application provides a computer program product. When program code included in the computer program product is executed by a processor in an electronic device, the methods in the first aspect and the second aspect are implemented.

According to a seventh aspect, this application provides a communication system. The system includes the access control apparatus according to any implementation of the third aspect.

In a possible implementation, the access apparatus according to any implementation of the fourth aspect is further included.

This application provides an access control method and apparatus, and a communication system. An information element carrying system status information, a time threshold, and/or access indication information is sent to indicate a current system state, so that after a non-vehicle-mounted device receives the foregoing new information, the non-vehicle-mounted device determines whether to initiate a random access request. This avoids impact, caused by random access request initiation performed by the non-vehicle-mounted device in this phase, on checking a status of a vehicle-mounted device by a CDC and access of the vehicle-mounted device. This also ensures that the vehicle-mounted device can run normally and some basic services can be run normally.

DESCRIPTION OF EMBODIMENTS

The following describes technical solutions in embodiments of this application with reference to accompanying drawings in embodiments of this application.

Figure 1:
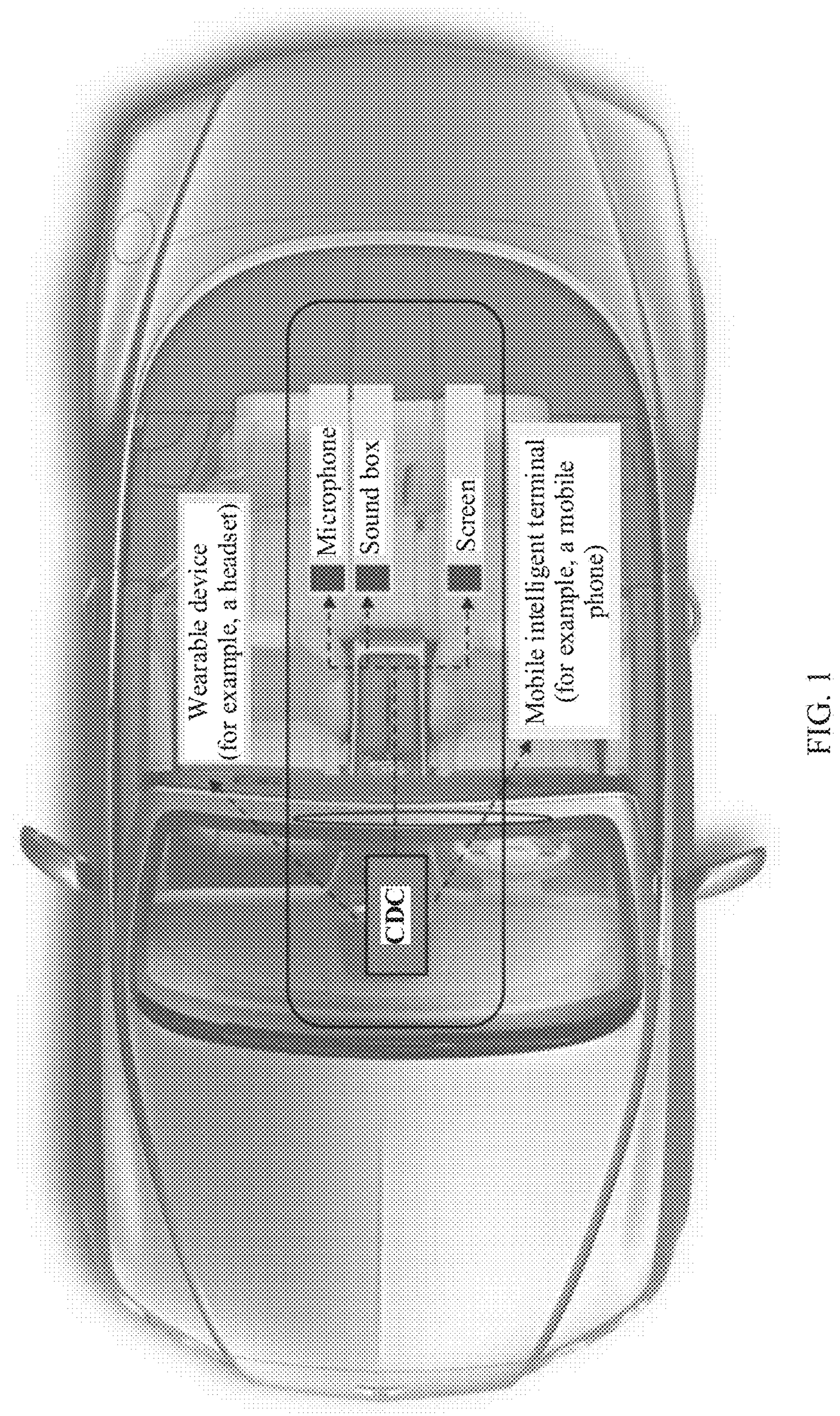
FIG. 1 is a schematic diagram of an application scenario according to an embodiment of this application.

For ease of description, a smart cockpit scenario applied to a vehicle is used as an example for describing this application. However, this application is not limited to a scenario of a vehicle. The solutions in this application may also be used for short-range communication in another scenario. FIG. 1 is a schematic diagram of an application scenario according to an embodiment of this application. As shown in FIG. 1, this scenario mainly exists in a smart cockpit environment inside a vehicle, and the smart cockpit environment may include a CDC, a vehicle-mounted device, and a non-vehicle-mounted device. The vehicle-mounted device and the non-vehicle-mounted device are two types of nodes with different attributes. The vehicle-mounted device may include but is not limited to any electronic device in a vehicle, such as a vehicle-mounted microphone, a vehicle-mounted loudspeaker, and a vehicle-mounted screen. Usually, the vehicle-mounted device is integrated by a vehicle manufacturer (vehicle/car manufacturer). Because integration of the vehicle-mounted device and the CDC is usually performed by one vehicle manufacturer, a connection relationship between the vehicle-mounted device and the CDC is fixed. The fixed connection relationship may be, for example, a fixed topological communication relationship. Certainly, the fixed connection relationship between the vehicle-mounted device and the CDC may be a wired connection or a wireless connection. The non-vehicle-mounted device may include but is not limited to any portable electronic device that does not belong to a vehicle, for example, a mobile phone, a headset, a wearable device, a tablet computer, a notebook computer, a digital camera, a personal digital assistant (personal digital assistant, PDA), or a laptop (laptop) computer. The CDC is connected to the vehicle-mounted device and the non-vehicle-mounted device in a wired or wireless manner, to control or manage the vehicle-mounted device and the non-vehicle-mounted device, and provide various functions for the smart cockpit environment.

It may be understood that the vehicle is a transportation device that moves on wheels on the ground, and includes but is not limited to a car, a scooter, a truck, a bus, and the like. The CDC is connected to an infotainment product installed in the vehicle and controls the infotainment product in the vehicle. In terms of functions, the CDC enables a person to control an in-vehicle infotainment facility and a related device, and may also be used to implement information communication between the vehicle and an external environment. It may be understood that the CDC is usually referred to as a control domain cockpit or a control domain cockpit CDC. "CDC", "control domain cockpit CDC", and "control domain cockpit" used in this application all have a same meaning.

In a case of wireless connection, the control domain cockpit CDC is responsible for overall management and coordination of radio resources, and needs to deploy various types of devices for data transmission. Because the vehicle-mounted device and the control domain cockpit CDC are usually integrated by one vehicle manufacturer, related information of the control domain cockpit CDC may be preconfigured on the vehicle-mounted device, and related information of the vehicle-mounted device may be preconfigured on the control domain cockpit CDC. For example, the vehicle-mounted device has vehicle properties, so that the vehicle-mounted device can quickly perform authentication and access. However, presence of the non-vehicle-mounted device is uncertain, and there is almost no preconfigured related information between the non-vehicle-mounted device and the control domain cockpit CDC. When the non-vehicle-mounted device is connected to the control domain cockpit CDC, procedures such as discovery, association, and security authentication are usually required for successful connection and communication. Therefore, how to preferentially ensure a status of the vehicle-mounted device and establish a connection to the control domain cockpit CDC when the vehicle-mounted device and the CDC are powered on is a problem that needs to be resolved. Usually, when powered on, the control domain cockpit CDC sends a system broadcast message, so that all vehicle-mounted devices or non-vehicle-mounted devices can initiate connections. However, in this case, the control domain cockpit CDC should preferentially check or learn of a status of the vehicle-mounted device and establish a connection to the vehicle-mounted device. Interruption in this process caused by access of a non-vehicle-mounted device is not expected by the control domain cockpit CDC.

Therefore, in this application, a status of the control domain cockpit CDC is determined, and then the status is carried in an information element in a system broadcast message and is sent to the non-vehicle-mounted device by broadcast, so that the non-vehicle-mounted device determines, based on the status of the control domain cockpit CDC, whether to perform access. In this way, it is ensured that access to the control domain cockpit CDC by the vehicle-mounted device is not affected by access of the non-vehicle-mounted device. Therefore, it is preferentially ensured that the vehicle-mounted device runs normally and implements a basic service function.

It may be understood that "XX information" and "XX message" in this application have a same meaning.

The following describes in detail technical solutions in embodiments of this application with reference to the accompanying drawings in embodiments of this application.

Figure 2:
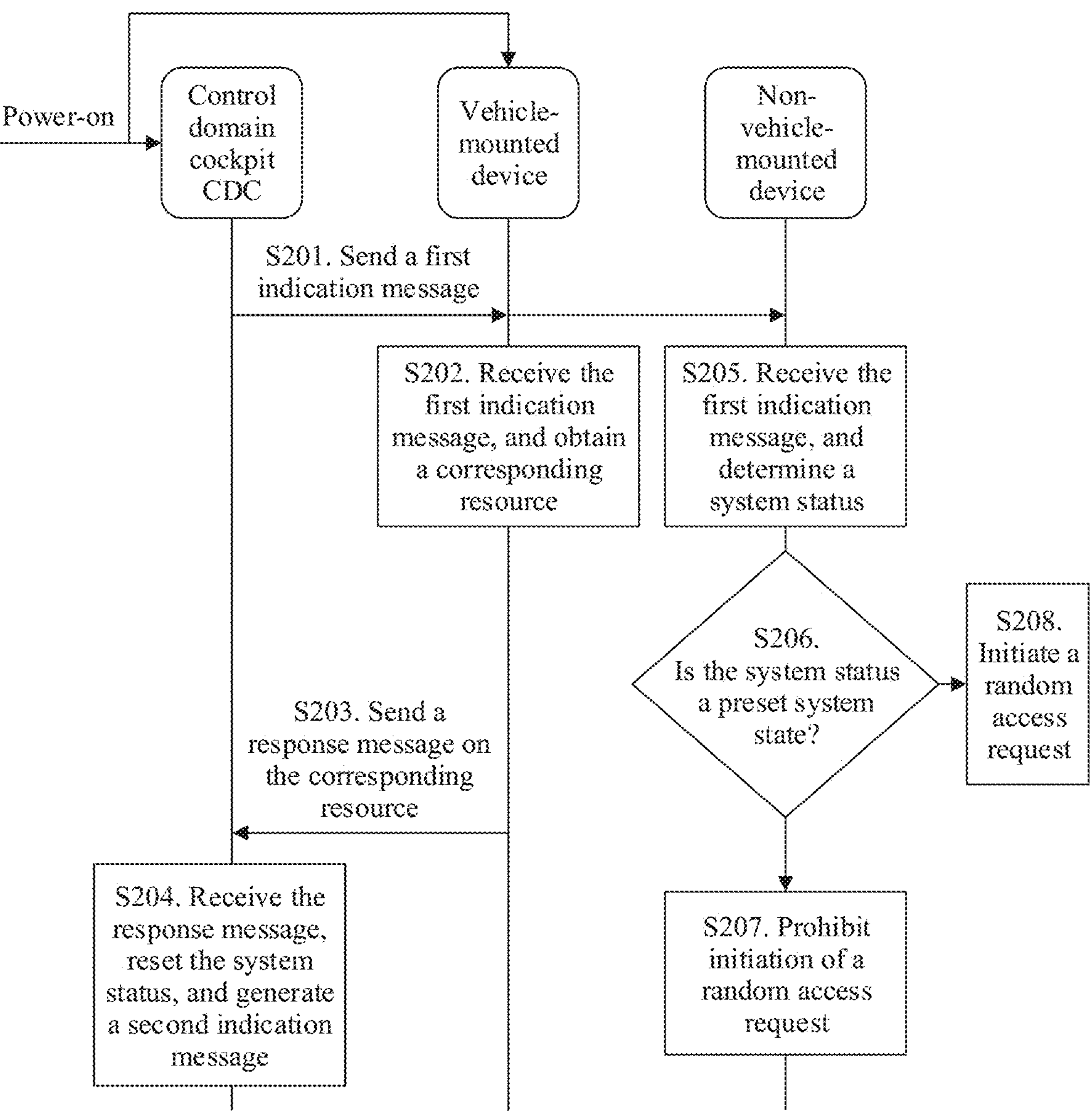
FIG. 2 is a diagram of information exchange between a CDC, a vehicle-mounted device, and a non-vehicle-mounted device according to an embodiment of this application.

FIG. 2 is a diagram of information exchange between a control domain cockpit CDC, a vehicle-mounted device, and a non-vehicle-mounted device according to an embodiment of this application.

This application relates to a communication system, where the system includes a master node and a slave node. The master node and the slave node are two types of nodes distinguished by logical functions. The master node manages the slave node. The master node can schedule a resource and is responsible for scheduling a time-frequency resource for the slave node. The slave node uses the time-frequency resource scheduled by the master node to communicate with the master node. The master node may be an access control apparatus, for example, a control domain cockpit CDC or another apparatus having an access control function. The slave node may be an access apparatus, for example, a vehicle-mounted device or a non-vehicle-mounted device.

A person skilled in the art may learn that technical solutions of this application can be applied to a first device, a second device, and a third device of any type that can apply communication manners provided in this application, and the second device and the third device are devices of different types that can communicate with the first device.

This application can be applied to a smart cockpit environment shown in FIG. 1, and can also be applied to a smart home environment in which there is a similar device relationship, a smart office environment, or any other environment in which there is a similar device relationship. For example, a device in the environment may be a mobile phone, a tablet computer, a desktop computer, a laptop computer, a handheld computer, a notebook computer, a UMPC, a netbook, a cellular phone, a PDA, an AR device, a VR device, an AI device, a wearable device, a vehicle-mounted device, a smart home device, and/or a smart city device. Specific types of the first device, the second device, and the third device are not limited in embodiments of this application.

It should be noted that interaction between the first device, the second device, and the third device is mainly described by using interaction between a control domain cockpit CDC, a vehicle-mounted device, and a non-vehicle-mounted device as an example in the following embodiments of this application. However, in this application, the first device is not limited to the control domain cockpit CDC, the second device is not limited to the non-vehicle-mounted device, and the third device is not limited to the vehicle-mounted device. It may be understood that the control domain cockpit CDC may be replaced with the first device, the vehicle-mounted device may be replaced with the third device, and the non-vehicle-mounted device may be replaced with the second device in the following embodiments.

It can be learned from FIG. 2 that, usually, after a vehicle is ignited, the control domain cockpit CDC and the vehicle-mounted device are powered on and started.

S201. Send a first indication message.

The control domain cockpit CDC sends the first indication message, so that the vehicle-mounted device or the non-vehicle-mounted device receives the first indication message and performs a corresponding operation.

Optionally, the first indication message may be carried in a system message (system information) or may be sent by broadcasting. For example, the system message may be a system broadcast message. In the following description of this application, the system broadcast message is used as an example. To some extent, the first indication message may be considered as a system broadcast message. The system broadcast message may be a MIB, a SIB, or a broadcast frame. The MIB may be carried on a PBCH. The SIB is usually carried on RRC signaling. It should be noted herein that, in all embodiments of this application, there is no such limit that first indication information is carried only in the system message or sent by broadcasting, and the first indication information may also be sent by using signaling of another type.

Generally, media access control (media access control, MAC) layer frames are classified into management frame (management frame) and data frame (data frame). The data frame is used to carry service data exchanged between the master node and the slave node. Before the master node and the slave node communicate with each other, a communication link between the master node and the slave node needs to be first established, so that corresponding operations such as security authentication and resource allocation can be performed on the communication link. The management frame is mainly used by the master node to manage the slave node, for example, including establishing and releasing of a connection between the master node and the slave node, performing security authentication, performing communication resource allocation, enabling hibernation and wake-up. It may be understood that, when the foregoing management functions are implemented, a message sent by the slave node to the master node also needs to be carried in the management frame.

From a perspective of a receive end of the MAC frame, the MAC frames may be classified into broadcast frame, multicast frame, and unicast frame. The unicast frame is a MAC frame sent to a single receive end; the multicast frame is a MAC frame sent to a group of receive ends; and the broadcast frame is a MAC frame sent to all receive ends. Certainly, it may be understood that a manner of sending the first indication message is not limited in this application, and the first indication message may be sent by broadcasting, multicasting, unicasting, or in any other equivalent manner.

In some embodiments, before the control domain cockpit CDC sends the system broadcast message, the control domain cockpit CDC may further determine a system status, and then allocate a corresponding resource for the vehicle-mounted device or the non-vehicle-mounted device. The first indication message carries indication information, and the indication information may be a resource allocated for the vehicle-mounted device or the non-vehicle-mounted device, and is information used to indicate whether the vehicle-mounted device or the non-vehicle-mounted device is allowed to access the control domain cockpit CDC.

In some examples, the indication information may be represented by indicating whether the vehicle-mounted device or the non-vehicle-mounted device is allowed to access the control domain cockpit CDC. For example, a first indication message sent to a vehicle-mounted device A carries information representing "access to the control domain cockpit CDC is allowed", or a first indication message sent to a non-vehicle-mounted device B carries information representing "access to the control domain cockpit CDC is not allowed". The information may be represented by an information element or several bits. For another example, the indication information may be system status indication information. After receiving the system status indication information, the vehicle-mounted device or the non-vehicle-mounted device may determine, based on a system status, whether access to the control domain cockpit CDC is allowed.

For example, when the control domain cockpit CDC is powered on, the control domain cockpit CDC may determine a system status of a system currently running on the control domain cockpit CDC, and then generate the first indication message. The first indication message may carry the system status indication information. The system status indication information may be an element used for status indication, used to indicate the system status of the system running on the control domain cockpit CDC. In an example, the system status indication information may be a Boolean variable. For example, different states of 1 bit may represent different indications. In another example, the system status indication information may alternatively be of an enumeration type. Certainly, a person skilled in the art should know that the system status indication information may alternatively be of any other equivalent data type. This is not limited herein in this application.

Certainly, in some other examples, the indication information may alternatively be represented as a resource, for example, a time domain resource, a frequency domain resource, a code domain resource, a time-frequency resource, or any other equivalent resource. This is not limited herein in this application. When a corresponding resource is allocated to the vehicle-mounted device or the non-vehicle-mounted device, it means that the vehicle-mounted device or the non-vehicle-mounted device is allowed to access the control domain cockpit CDC. It may be understood that the allocated corresponding resource may be used as a response resource for the vehicle-mounted device or the non-vehicle-mounted device, so that the vehicle-mounted device or the non-vehicle-mounted device sends response information on the allocated resource.

For example, when allocating a corresponding response resource for a device that is to perform access, the control domain cockpit CDC may determine a corresponding response resource for each device that is to perform access. The response resource may be a specific determined time-frequency resource. A corresponding time-frequency resource is allocated to each device, to ensure that a corresponding device can send response information to the control domain cockpit CDC on the determined time-frequency resource. The response information may indicate a device status of an accessing device. Therefore, the first indication message may further carry a correspondence between the response resource and the accessing device. In an example, the correspondence between the response resource and the accessing device may be explicit. For example, the correspondence between the response resource and the accessing device is directly carried in the system broadcast message. Certainly, in another example, the correspondence between the response resource and the accessing device may be implicit. For example, the accessing device may obtain the response resource for the accessing device based on a preconfigured identifier (for example, an ID), a time-frequency resource indicated in the system broadcast message, and a preset rule. In other words, the accessing device obtains the preconfigured identifier (for example, the ID), the time-frequency resource indicated in the system broadcast message, and the response resource meet a preset rule or a mapping relationship. The preset rule may be agreed in advance in protocols, and/or the preconfigured identifier may be configured before the accessing device is delivered from a factory, or may be configured by the control domain cockpit CDC for the accessing device when the accessing device connects to the control domain cockpit CDC last time. Certainly, the configured response resource may alternatively be negotiated in advance by the control domain cockpit CDC and the accessing device, and the control domain cockpit CDC does not use the system broadcast message to carry information about a response message. The corresponding accessing device may directly indicate the device status of the accessing device to the control domain cockpit CDC on the corresponding time-frequency resource based on the negotiated response message.

In some other embodiments, the control domain cockpit CDC may further group terminal devices that are to perform access. It may be understood that the terminal device that is to perform access may be a vehicle-mounted device, or may be a non-vehicle-mounted device. For example, the devices may be grouped based on locations of the devices or device types of the devices. Usually, a vehicle-mounted device and a non-vehicle-mounted device that are at a same location are not classified into a same group. In other words, terminal devices in a same group are all vehicle-mounted devices or non-vehicle-mounted devices, or devices of a same preset type. Optionally, each group has a corresponding multicast address. It may be understood that, certainly, grouping may be performed according to any standard. This is not limited herein in this application.

The control domain cockpit CDC groups terminal devices having a same feature into a group. Vehicle-mounted devices are used as an example. A back-row loudspeaker and a microphone in a smart cockpit environment may be classified into one group, a front-row loudspeaker and a microphone located in the smart cockpit environment may be classified into another group, and the like. For another example, loudspeakers at all locations in the smart cockpit environment are classified into one group, microphones at all locations are classified into one group, and the like. Then the control domain cockpit CDC allocates a corresponding response resource to each group of devices. The allocated response resource is used by all terminal devices in the group. It may be understood that, for the corresponding resource allocated to each group, a terminal device in the group may further determine, according to a specific rule, a response resource for the terminal device from the response resource allocated to the group. Similarly, a similar grouping manner may be implemented on non-vehicle-mounted devices.

In another example, the group may be in a form of an array. For example, loudspeakers or microphones may be in an array. Usually, physical locations of a plurality of terminal devices in an array are close, and there is a central node to manage the devices in the array. For an array, one response resource may be allocated to one array, so that the array can feed back a status of devices in the array on the allocated response resource.

In an example, after the vehicle-mounted device is powered on, self-check of the vehicle-mounted device may be performed based on a program or an instruction preconfigured in the vehicle-mounted device. It may be understood that the self-check of the vehicle-mounted device is performed by the vehicle-mounted device mainly for checking whether a problem such as damage or an error occurs on the vehicle-mounted device, to ensure that the vehicle-mounted device can run normally. Preconfigured information may be configuration information prestored in the vehicle-mounted device. In an example, the configuration information of the vehicle-mounted device may be configured before the vehicle is delivered from a factory, or certainly, may be preconfigured in another manner before the vehicle-mounted device is powered on.

In some examples, the devices that are to perform access are vehicle-mounted devices. Because a probability that a vehicle-mounted device exception occurs is very low, when allocating a corresponding response resource for the vehicle-mounted devices or non-vehicle-mounted devices, the control domain cockpit CDC may configure only a vehicle-mounted device whose device status is abnormal to use the response resource, so that only the abnormal device sends a device status to the control domain cockpit CDC on the response resource.

S202. Receive the first indication message, and further determine the corresponding resource.

For the vehicle-mounted device, after receiving the first indication message sent by the control domain cockpit CDC, the vehicle-mounted device may determine, based on the first indication message, whether access to the control domain cockpit CDC is allowed. If the vehicle-mounted device may obtain, from the first indication message, a response resource corresponding to the vehicle-mounted device, it may be considered that the vehicle-mounted device is allowed to access the control domain cockpit CDC. It may be understood that, if the correspondence between the response resource and the accessing device is explicit, each vehicle-mounted device may directly obtain a response resource corresponding to the vehicle-mounted device from the first indication message. Certainly, if the correspondence between the response resource and the accessing device is implicit, each vehicle-mounted device may obtain the response resource for the accessing device through computing based on a preconfigured identifier (for example, an ID), a time-frequency resource indicated in the system broadcast message, and a preset rule. It may be understood that response resources corresponding to different terminal devices may be different, that is, the control domain cockpit CDC may allocate response resources for different terminal devices respectively; or the response resources may be the same, that is, different terminal devices share a same response resource.

In some examples, after receiving the first indication message, the vehicle-mounted device may generate a response message.

For each vehicle-mounted device, after obtaining the corresponding response resource, the vehicle-mounted device may generate a response message of the vehicle-mounted device. The response message includes device status information. The device status information is used to indicate a device status of the terminal device, for example, a normal state or an abnormal state. Certainly, in some examples, the device status information may be represented by 0 and 1. For example, 1 indicates a normal state of the device, and 0 indicates an abnormal state of the device. Certainly, in some other examples, 0 indicates the normal state of the device, and 1 indicates the abnormal state of the device. Certainly, any other equivalent form such as a value, a letter, or a word may be used for replacement. This is not limited herein in this application.

It may be understood that the response message may further include an ID of the device.

It may be understood that, in some examples, it may be agreed in protocols of the two parties that only a device in an abnormal state is reported. In this case, the response message may include only the device ID, and after receiving the device ID, the CDC may know that the device is in the abnormal state. Similarly, it may alternatively be agreed in the protocols that only a device in a normal state is reported, and details are not described herein again.

In some examples, the device may report both the device ID and the device status. If a device 1 is in the normal state, a response message may indicate an ID of the device 1 and indicate that a state is normal. If a device 2 is in the abnormal state, a response message may indicate an ID of the device 2 and indicate that a state is abnormal. For example, information such as "a state is normal" or "a state is abnormal" may be represented by an information element or several bits.

In some examples, the CDC requires only the device in the abnormal state to report the response message. It is assumed that the device 1 and the device 2 are classified into one group and a shared response resource is allocated, where a group address is ID 1. The device 1 is in the normal state, and the device 2 is in the abnormal state. In this case, the device 2 may send, on the resource, the ID of the device 2 or the group address ID 1 to which the device 2 belongs.

If the control domain cockpit CDC groups the vehicle-mounted devices, a device group may be in a form of an array. For the plurality of the vehicle-mounted devices in the array, one response message is jointly generated, to indicate a device status of the devices in the array. For example, 1 indicates a normal state of the devices in the array, and 0 indicates an abnormal state of the devices in the array. Certainly, in some other examples, 0 indicates the normal state of the devices in the array, and 1 indicates the abnormal state of the devices s in the array.

For the status of the devices in the array, if all devices in the array are in the normal state, it is considered that the devices in the device group are in the normal state, and if devices in any quantity in the array are in the abnormal state, it is considered that the devices in the array are in the abnormal state. Certainly, in another example, the status of the devices in the array may alternatively be determined based on a proportion of normal devices or abnormal devices in the array. For example, when the proportion of the normal devices or the abnormal devices is higher than a preset proportion threshold, it is considered that the devices in the array are in the abnormal state; otherwise, it is considered that the devices in the array are in the normal state. Certainly, the status of the devices in the array may alternatively be determined based on a quantity of abnormal devices in the array. For example, if the quantity of the abnormal devices in the array exceeds a preset quantity threshold, it is considered that the devices in the array are in the abnormal state; otherwise, it is considered that the devices in the array are in the normal state. It is clear that the status of the devices in the array may be determined in any equivalent manner. This is not limited herein in this application.

In some examples, w % ben the vehicle-mounted device generates the response message, the device ID of the vehicle-mounted device may further be carried. If a plurality of vehicle-mounted devices form an array, the response message may further carry at least one of an array address and a multicast address.

In some other examples, the response resource may be shared by a plurality of vehicle-mounted devices. For a device in the abnormal state, the device may send an ID of the device on the response resource, so that when the control domain cockpit CDC receives the response message, the control domain cockpit CDC determines which vehicle-mounted device is in the abnormal state. Usually, because both the control domain cockpit CDC and the vehicle-mounted devices are manufactured by one vehicle manufacturer and are integrated into one vehicle, the control domain cockpit CDC may prestore IDs of the vehicle-mounted devices.

It may be understood that, because a fault rate of a vehicle-mounted device usually is low and a probability that two devices are simultaneously in the abnormal state is also low, it is appropriate to allocate a shared response resource to a plurality of vehicle-mounted devices.

S203. Send the response message on the corresponding resource. It should be noted that this step is optional, and is only for a vehicle-mounted device whose access is allowed and that can send the response message. A vehicle-mounted device whose access is not allowed does not need to send the response message.

Optionally, after generating the corresponding response information, the vehicle-mounted device may send the response message to the control domain cockpit CDC on the response resource corresponding to the vehicle-mounted device.

S204. Receive the response message, and further generate a second indication message.

Execution of S204 corresponds to that of S203. It may be understood that, after receiving the response message, the control domain cockpit CDC may re-determine the system status. If the control domain cockpit CDC does not receive the response message, the system status may not need to be re-determined. Certainly, in another example, alternatively, the control domain cockpit CDC may periodically, semi-periodically, or aperiodically determine the system status without determining whether the response message sent by the vehicle-mounted device is received.

After receiving response messages sent by vehicle-mounted devices, if corresponding response resources are allocated to different vehicle-mounted devices or arrays, the control domain cockpit CDC may determine, based on the different response resources, which vehicle-mounted devices or arrays send the response messages. Then it is determined, based on device statuses or statuses of devices in the arrays in the response message, whether the vehicle-mounted devices or arrays are in the abnormal state. Certainly, if the control domain cockpit CDC does not allocate time-frequency resources to different vehicle-mounted devices respectively, the response information further carries device IDs. Therefore, which vehicle-mounted devices or device groups are in the abnormal state may be determined based on the device IDs.

After determining the device statuses of the vehicle-mounted devices, the control domain cockpit CDC may re-determine the system status, and determine a second indication message based on a new system status. The second indication message is a new system broadcast message. A type of the new system broadcast message is the same as or different from that of the system broadcast message in S201. For ease of description, details are not described herein again.

It may be understood that, if the control domain cockpit CDC receives the response message and determines that all expected vehicle-mounted devices are in the normal state, the control domain cockpit CDC may re-determine the system status and allow, by sending the second indication message, access of the non-vehicle-mounted device.

Certainly, if the vehicle-mounted device expected by the control domain cockpit CDC is in the abnormal state, or other processing needs to be performed, the control domain cockpit CDC may not re-determine the system status. Because the system broadcast message is usually sent periodically, the non-vehicle-mounted device still performs an operation according to instruction of the first indication message.

It may be understood that receiving the response message and re-determining the system status may be associated to some extent, or may be independent of each other.

In an example, the system status may include one of a system preparation state, a vehicle-mounted device accessing state, a system running state, and an access allowed state. Certainly, in another example, another possible system state may be further included. This is not limited in this application. The system preparation state and/or the vehicle-mounted device accessing state may be used to indicate that the vehicle-mounted device is accessing the control domain cockpit CDC, or the vehicle-mounted device is performing self-check, so that the non-vehicle-mounted device chooses, based on these types of system states, not to access the control domain cockpit CDC. The system running state and/or the access allowed state may be used to indicate that the vehicle-mounted device has accessed the control domain cockpit CDC. In this case, the non-vehicle-mounted device may be allowed to access the control domain cockpit CDC.

A person skilled in the art may understand that a process in which the control domain cockpit CDC determines the status of the vehicle-mounted device may also be considered as a process in which the vehicle-mounted device accesses the control domain cockpit CDC. The response message sent by the vehicle-mounted device may be considered as an access request message of the vehicle-mounted device to some extent.

Return to S201. After the control domain cockpit CDC sends the first indication message, the non-vehicle-mounted device may also receive the first indication message sent by the control domain cockpit CDC. Therefore, the following steps may be further performed after S201.

S205. Receive the first indication message.

For the non-vehicle-mounted device, when the first indication message sent by the control domain cockpit CDC is received, for example, the first indication message is the system broadcast message, it is determined, based on the system broadcast message, whether the non-vehicle-mounted device is allowed to access the control domain cockpit CDC. In an example, the system status of the system currently running on the control domain cockpit CDC may be determined based on the system status indication information carried in the system broadcast message, and whether the non-vehicle-mounted device is allowed to access the control domain cockpit CDC is determined based on the system status. Certainly, in another example, if the first indication message sent by the control domain cockpit CDC directly indicates whether the non-vehicle-mounted device is allowed to access the control domain cockpit CDC, based on the information in the first indication message, S207 may be performed if the non-vehicle-mounted device is not allowed to access the control domain cockpit CDC; or S208 may be performed if the non-vehicle-mounted device is allowed to access the control domain cockpit CDC.

S206. Determine whether the system status is a preset system state. It should be noted that this step is optional, and is applied only in a case where the first indication message includes the system status indication information. If the first indication message includes the information used to directly indicate whether access is allowed, the system status does not need to be determined.

To be specific, in S205, the non-vehicle-mounted device determines whether the system status is the preset system state.

In an example, if the preset system state is the system preparation state or the vehicle-mounted device accessing state, it is determined that the non-vehicle-mounted device is not allowed to access the control domain cockpit CDC, and S207 is performed; otherwise, it is determined that the non-vehicle-mounted device is allowed to access the control domain cockpit CDC, and S208 is performed. Certainly, the system status may alternatively be any other equivalent system state. This is not limited herein in this application. However, it may be understood that when the system status is the preset system state in this example, the vehicle-mounted device is performing device access.

In another example, if the preset system state is the system running state or the access allowed state, it is determined that the non-vehicle-mounted device is allowed to access the control domain cockpit CDC, and S208 is performed; otherwise, it is determined that the non-vehicle-mounted device is not allowed to access the control domain cockpit CDC, and S207 is performed. Certainly, the system status may alternatively be any other equivalent system state. This is not limited herein in this application. It may be understood that when the system status is the preset system state in this example, the vehicle-mounted device has completed device access.

S207. Prohibit the non-vehicle-mounted device from initiating a random access request.

The non-vehicle-mounted device is prohibited from initiating the random access request to the control domain cockpit CDC.

S208. Allow the non-vehicle-mounted device to initiate a random access request.

The non-vehicle-mounted device is allowed to initiate the random access request to the control domain cockpit CDC.

In this application, the system broadcast message carries the system status indication information. When the vehicle-mounted device is performing self-check or establishing a connection to the control domain cockpit CDC, the non-vehicle-mounted device is prohibited from initiating the random access request. This avoids impact, caused by random access request initiation performed by the non-vehicle-mounted device in this phase, on checking the status of the vehicle-mounted device by the control domain cockpit CDC and access of the vehicle-mounted device. In this way, it is ensured that the vehicle-mounted device can run normally and some basic services can be run normally.

Figure 3:
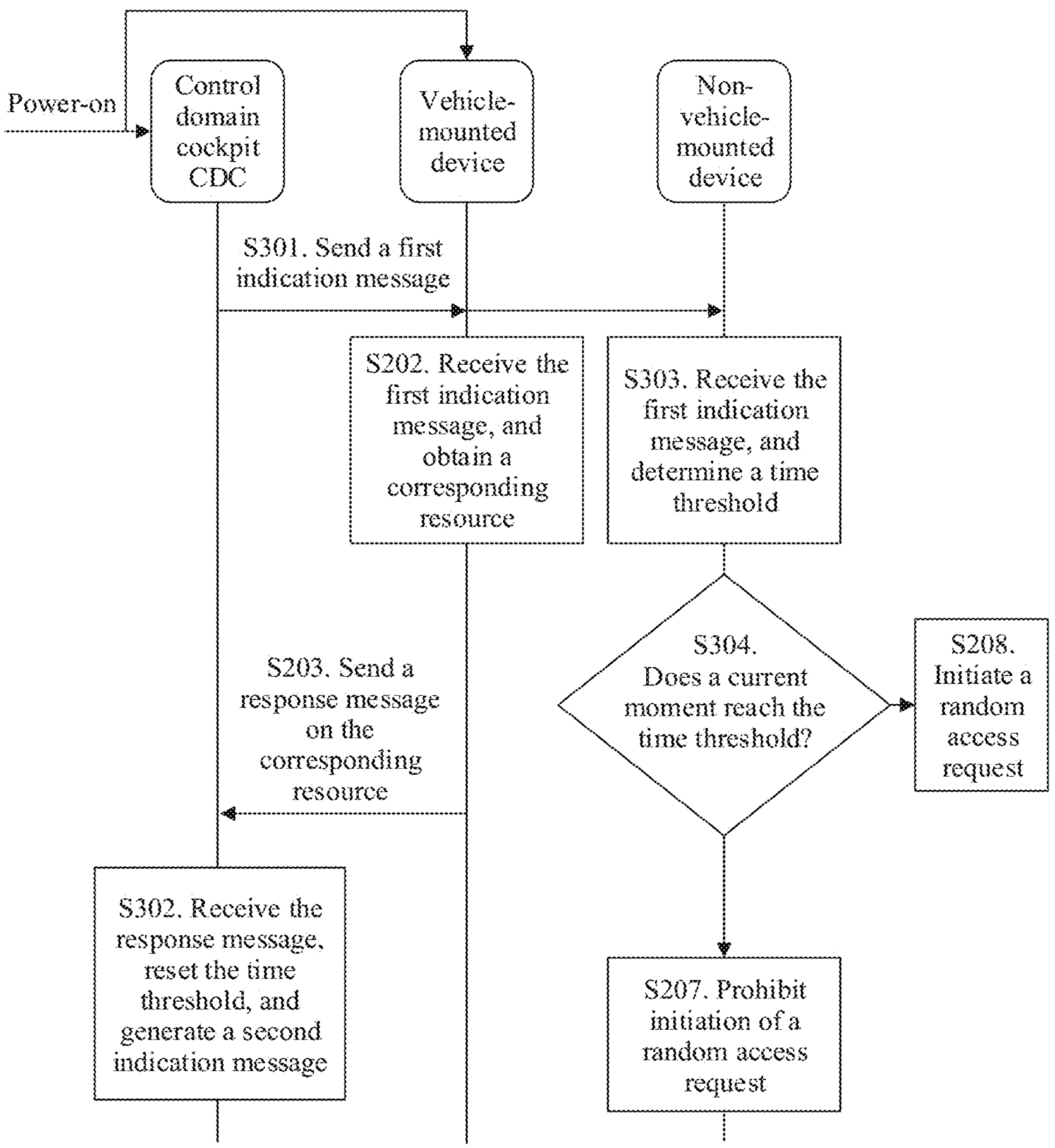
FIG. 3 is a diagram of another type of information exchange between a CDC, a vehicle-mounted device, and a non-vehicle-mounted device according to an embodiment of this application.

FIG. 3 is a diagram of another type of information exchange between a CDC, a vehicle-mounted device, and a non-vehicle-mounted device according to an embodiment of this application.

Instead of the manner of determining the system status described in S201 in FIG. 2, in another case, a manner of setting a time threshold may be used. For example, S301 may be performed.

S301. Send a first indication message.

The control domain cockpit CDC sends the first indication message, so that after the non-vehicle-mounted device receives the first indication message, the non-vehicle-mounted device determines whether access to the control domain cockpit CDC is allowed. Optionally, the first indication message may be a system broadcast message. Certainly, it may be understood that a manner of sending the first indication message is not limited in this application, and the first indication message may be sent by broadcasting, multicasting, or in any other equivalent manner. It may be understood that this application mainly describes how to avoid impact, caused by random access request initiation performed by a non-vehicle-mounted device in this phase, on checking a status of a vehicle-mounted device by a control domain cockpit CDC and access of the vehicle-mounted device. Therefore, the vehicle-mounted device may ignore time threshold information in the first indication message. Certainly, in some examples, the vehicle-mounted device may alternatively determine, based on the time threshold information, whether to access the control domain cockpit CDC.

In some embodiments, the first indication message may carry the time threshold information. The time threshold information may be time domain indication information used to indicate a time threshold. The time threshold information may be a system frame number (system frame number, SFN), or an offset from a specific fixed reference frame. For example, the fixed reference frame may be a first reference frame. The fixed reference frame may be a frame 0, and certainly may alternatively be any other reference frame. Certainly, the time threshold may alternatively be a specific value or a time range. This is not limited herein in this application.

In an optional implementation, the time threshold information may be the system frame number. Take a system frame number 256 as an example. When the non-vehicle-mounted device determines that a current system frame number is less than or equal to the system frame number 256, the non-vehicle-mounted device is not allowed to initiate access.

In another optional implementation, the time threshold information may be one or more time domain offsets relative to a specific fixed reference frame. For example, the time domain offset may be 256 ms. The fixed reference frame may be negotiated or agreed upon in advance between the had unit CDC and the vehicle-mounted device or the non-vehicle-mounted device, or may be defined in protocols. For example, the fixed reference frame is a frame numbered 64, and it is assumed that a time length of a single frame is 0.5 ms. It is assumed that a current frame number is 20, and a current absolute time is 10 ms. The non-vehicle-mounted device is not allowed to initiate access within an absolute time of 256 ms+64×0.5=288 ms.

In still another optional implementation, the time threshold information may alternatively be a time domain offset relative to first signaling. The time domain offset may be the time threshold, indicating that initiation of random access is not allowed within a specific time range.

The first signaling may be specific signaling agreed upon or negotiated between the control domain cockpit CDC and the non-vehicle-mounted device in advance, or specific signaling defined in protocols. Take specific RRC signaling as an example. The RRC signaling includes an SIB. For example, the SIB may be sent periodically. When the SIB is sent at a specific fixed time, in a possible implementation, the non-vehicle-mounted device may not be allowed to initiate access in a specific time window after the control domain cockpit CDC sends the SIB because the control domain cockpit CDC may need to handle another issue in this time period. In this case, since a moment at which the CDC sends the SIB+[a time domain offset 1, a time domain offset 2], a terminal is not allowed to initiate random access to the CDC in a time window [the moment at which the CDC sends the SIB+the time domain offset 1, the moment at which the CDC sends the SIB+the time domain offset 2]. It may be understood that the RRC signaling may be carried in a management frame. It should be noted that [the time domain offset 1, the time domain offset 2] may be represented by an information element or several bits.

For another example, in a possible implementation, the non-vehicle-mounted device may not be allowed to initiate access in a specific time window after obtaining specific RRC signaling (for example, the first RRC signaling) because the control domain cockpit CDC may need to handle another issue in this time period. For example, if a moment at which the non-vehicle-mounted device successfully receives the first RRC signaling is a first moment, the terminal is not allowed to initiate random access to the control domain cockpit CDC in a time window [the first moment+the time domain offset 1, the first moment+the time domain offset 2]. It may be understood that the RRC signaling may be carried in a control frame.

It may be understood that the time threshold information may be one time domain offset or a plurality of time domain offsets.

To ensure that the vehicle-mounted device is not affected by access of the non-vehicle-mounted device when the vehicle-mounted device performs self-check or accesses the control domain cockpit CDC, the time threshold information carried in the first indication message may be for the non-vehicle-mounted device. In an example, different time thresholds may be set for different non-vehicle-mounted devices. Certainly, if there is a device group including a plurality of non-vehicle-mounted devices, the device group may be in a form of an array. Alternatively, different time thresholds may be set for different non-vehicle-mounted device arrays. This is not limited herein in this application. In another example, an expression form of the time threshold in the system broadcast message may be explicit, or certainly may be implicit. For an implementation process thereof, refer to S201. For ease of description, details are not described herein again.

For setting of the time threshold, the control domain cockpit CDC may be set based on a status of self-check performed by the vehicle-mounted device or a status of connection establishment with the control domain cockpit CDC.

S202 and S203 are performed after S301. Implementation processes of S202 and S203 in FIG. 3 are the same as those of S202 and S203 in FIG. 2. For ease of description, details are not described herein again.

S302 may be performed after S203.

S302. Receive the response message, and further generate a second indication message.

Execution of S302 corresponds to that of S203. It may be understood that, after receiving the response message, the control domain cockpit CDC may reset time thresholds for different non-vehicle-mounted devices. If the control domain cockpit CDC does not receive the response message, the time threshold may not need to be reset. In another example, alternatively, the control domain cockpit CDC may periodically, semi-periodically, or aperiodically set the time threshold without determining whether the response message sent by the vehicle-mounted device is received.

Specifically, after the response message is received, the time threshold may be reset. It may be understood that receiving the response message and resetting the time threshold may be associated to some extent, or may be independent of each other.

After receiving the response message sent by the vehicle-mounted device, the control domain cockpit CDC determines the device status of the vehicle-mounted device, and resets the time threshold based on the device status of the vehicle-mounted device. Then the second indication message can be determined based on a new time threshold. The second indication message is a new system broadcast message. A type of the new system broadcast message is the same as or different from that of the system broadcast message in S301. For ease of description, details are not described herein again.

Return to S301. After the control domain cockpit CDC sends the first indication message, the non-vehicle-mounted device may also receive the first indication message sent by the control domain cockpit CDC. Therefore, the following steps may be further performed after S301.

S303. Receive the first indication message.

For the non-vehicle-mounted device, when the first indication message sent by the control domain cockpit CDC is received, for example, the first indication message is the system broadcast message, it is determined, based on the system broadcast message, whether the non-vehicle-mounted device is allowed to access the control domain cockpit CDC. In an example, the time threshold set by the control domain cockpit CDC for the non-vehicle-mounted device may be determined based on the time threshold information carried in the system broadcast message, and whether the non-vehicle-mounted device is allowed to access the control domain cockpit CDC is determined based on the time threshold of the non-vehicle-mounted device. Certainly, in another example, if the first indication message sent by the control domain cockpit CDC directly indicates whether the non-vehicle-mounted device is allowed to access the control domain cockpit CDC, based on the information in the first indication message, S207 may be performed if the non-vehicle-mounted device is not allowed to access the control domain cockpit CDC; or S208 may be performed if the non-vehicle-mounted device is allowed to access the control domain cockpit CDC.

S304. Determine whether a current moment reaches the time threshold. It should be noted that this step is optional, and is applied only in a case where the first indication message includes the time threshold information. If the first indication message directly indicates whether access is allowed, whether the time threshold reaches the time threshold does not need to be determined.

Specifically, the non-vehicle-mounted device determines whether the current moment reaches the time threshold.

In an example, if the current moment reaches time specified by the time threshold, it is determined that the non-vehicle-mounted device is not allowed to access the control domain cockpit CDC, and S207 is performed; otherwise, it is determined that the non-vehicle-mounted device is allowed to access the control domain cockpit CDC, and S208 is performed. Certainly, the time threshold may be a system frame number, or an offset from a specific fixed reference frame.

Implementation processes of S207 and S208 are the same as those of S207 and S208 in FIG. 2. For ease of description, details are not described herein again.

In this application, the system broadcast message carries the time threshold information, to ensure that the non-vehicle-mounted device is prohibited from initiating the random access request before the preset time threshold is reached, or the non-vehicle-mounted device is allowed to initiate the random access request after the preset time threshold is reached. This avoids impact, caused by random access request initiation performed by the non-vehicle-mounted device in this phase, on checking the status of the vehicle-mounted device by the CDC and access of the vehicle-mounted device. In this way, it is ensured that the vehicle-mounted device can run normally and some basic services can be run normally.

Figure 4:
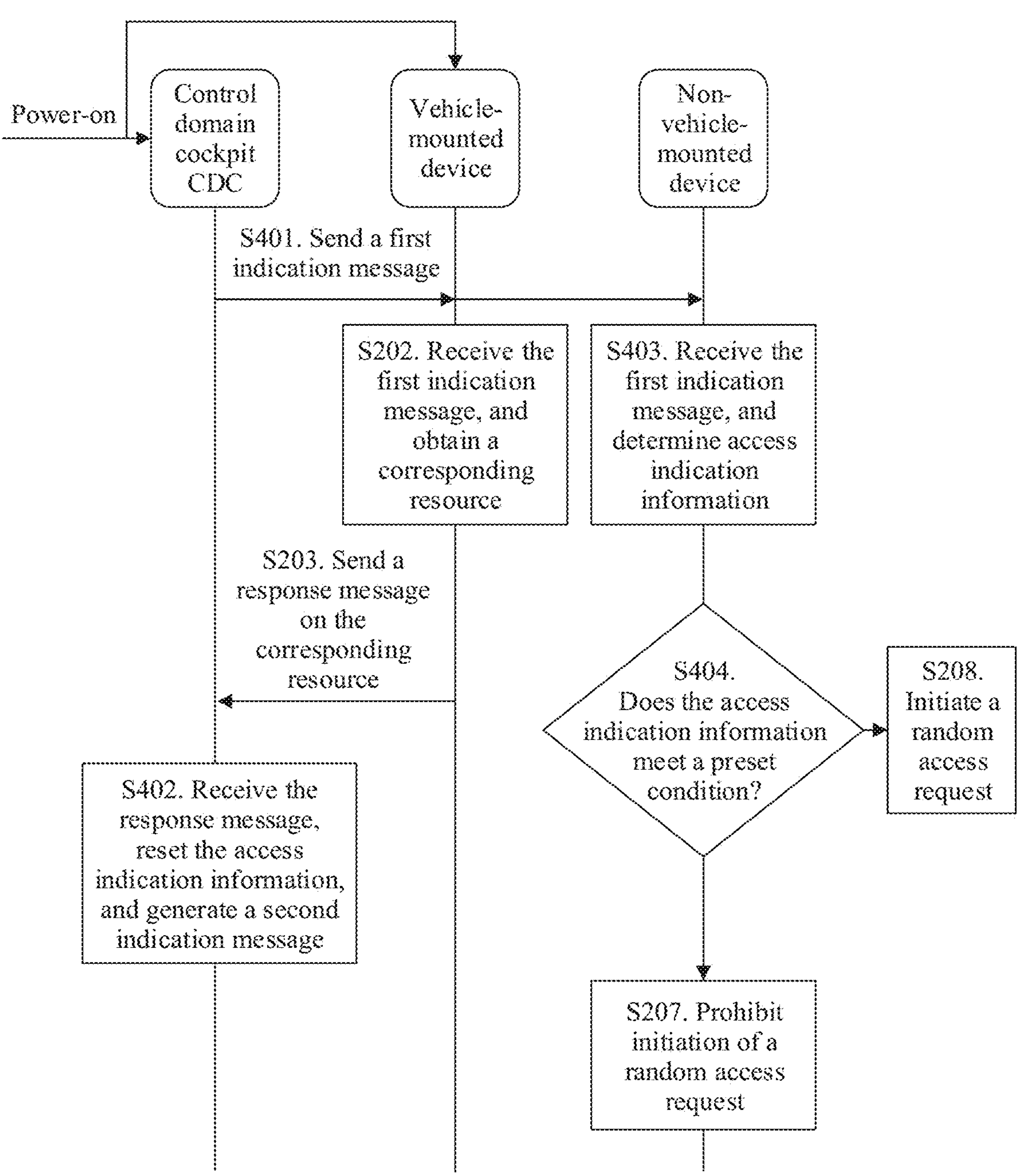
FIG. 4 is a diagram of still another type of information exchange between a CDC, a vehicle-mounted device, and a non-vehicle-mounted device according to an embodiment of this application.

FIG. 4 is a diagram of still another type of information exchange between a CDC, a vehicle-mounted device, and a non-vehicle-mounted device according to an embodiment of this application.

Instead of the manner of determining the system status described in S201 in FIG. 2 and the manner of setting the time threshold described in S301 in FIG. 3, in still another case, a manner of setting access indication information may be used. For example, S401 may be performed.

S401. Send a first indication message.

The control domain cockpit CDC sends the first indication message, so that after the vehicle-mounted device or the non-vehicle-mounted device receives the first indication message, the vehicle-mounted device or the non-vehicle-mounted device determines whether access to the control domain cockpit CDC is allowed. Optionally, the first indication message may be a system broadcast message. Certainly, it may be understood that a manner of sending the first indication message is not limited in this application, and the first indication message may be sent by broadcasting, multicasting, or in any other equivalent manner.

In some embodiments, the system broadcast message may carry access indication information. The access indication information may be a mapping table about device types and access relationships, or in other words, the access indication information may indicate a mapping relationship between a device type and an access relationship. The mapping table or the mapping relationship is used to indicate which types of devices can initiate a random access request and which types of devices are prohibited from initiating the random access request. In an example, the device types may be classified into vehicle-mounted device and non-vehicle-mounted device; or may be classified into microphone, loudspeaker, mobile phone, or the like; or may be classified into vehicle-mounted device previously connected to the control domain cockpit CDC or vehicle-mounted device that has not been connected to the control domain cockpit CDC, or the like. The device type may also be indicated by a corresponding type index or number. This is not limited herein in this application.

The mapping table about the device types and the access relationships may be explicit or implicit. For example, an explicit correspondence table may be configured, for example, Table 1. It should be noted that all tables in the solutions of this application are intended to reflect a correspondence, and are merely an expression form of the correspondence. Any other expression form that can reflect the correspondence may replace the table. In this application, the table is a generalization of all possible expression forms.

TABLE 1

| Terminal device | Access relationship |
| --- | --- |
| Vehicle-mounted microphone | 0 |
| Vehicle-mounted loudspeaker | 0 |
| Mobile phone | 1 |

It is assumed that 0 indicates that access is allowed and 1 indicates that access is not allowed. It can be learned from Table 1 that access of the vehicle-mounted microphone and the vehicle-mounted loudspeaker is allowed, and access of the mobile phone is not allowed. Certainly, it may be understood that the type of the responding device may also be indicated by device type indication information. For example, if “000” is used to identify the vehicle-mounted microphone, {000, 0} may indicate that the vehicle-mounted microphone is allowed to access.

If the mapping table about the device types and the access relationships is implicit, for example, based on a protocol agreement, a bitmap (bitmap) may be used to indicate which types of devices are allowed to access. Usually, according to the protocol agreement, each bit of the bitmap may identify a device type. It is assumed that a bitmap length is three bits, and each bit sequentially corresponds to a vehicle-mounted microphone, a vehicle-mounted loudspeaker, and a mobile phone. When a bitmap {001} is sent, it indicates that access of the vehicle-mounted microphone and the vehicle-mounted loudspeaker is allowed, and access of the mobile phone is not allowed. Certainly, in another example, alternatively, 1 may indicate that access is allowed, and 0 may indicate that access is not allowed, or any other number may be used for equivalent replacement. This is not limited herein in this application.

In an example, further, different types of devices may be of different device priorities. The mapping table about the device types and the access relationships may be replaced with a mapping table that is based on the device priorities and the access relationships. The mapping table is used to indicate whether the devices of different priorities are allowed to initiate the random access request. Certainly, it may be understood that devices of different types may be of a same device priority. Optionally, the device priority may also be an access priority. Usually, a device of a higher priority may be of a higher access priority. For example, priorities of the vehicle-mounted microphone and the vehicle-mounted loudspeaker are 1, and a priority of the mobile phone is 2. If a device priority carried in the first indication message is 1, access of the vehicle-mounted microphone and the vehicle-mounted loudspeaker is allowed.

In another example, if there is a device group including a plurality of non-vehicle-mounted devices, the device group may be in a form of an array. For different non-vehicle-mounted device arrays, the mapping table about the device types and the access relationships or the mapping table based on the device priorities and the access relationships may be set. This is not limited herein in this application. In another example, an expression form of the access indication information in the system broadcast message may be explicit, or certainly may be implicit. For an implementation process thereof, refer to S201. For ease of description, details are not described herein again.

S202 and S203 are performed after S401. Implementation processes of S202 and S203 in FIG. 4 are the same as those of S202 and S203 in FIG. 2. For ease of description, details are not described herein again.

S402 may be performed after S203.

S402. Receive the response message, and further generate a second indication message.

Execution of S402 corresponds to that of S203. It may be understood that, if the control domain cockpit CDC receives the response message and determines that all expected vehicle-mounted devices are in a normal state. In this case, the control domain cockpit CDC may reset the access indication information, and allow, by sending the second indication message, access of the non-vehicle-mounted device. Certainly, if the vehicle-mounted device expected by the control domain cockpit CDC is in an abnormal state, or other processing needs to be performed, the control domain cockpit CDC may not reset the access indication information. Because the system broadcast message is usually sent periodically, the non-vehicle-mounted device still performs an operation according to instruction of the first indication message.

After receiving the response message sent by the vehicle-mounted device, the control domain cockpit CDC determines the device status of the vehicle-mounted device, and resets the access indication information based on the device status of the vehicle-mounted device. Then the second indication message can be determined based on a new indication information. The second indication message is anew system message. A type of the new system message is the same as or different from that of the system broadcast message in S301. For ease of description, details are not described herein again.

Return to S401. After the control domain cockpit CDC sends the first indication message, the non-vehicle-mounted device may also receive the first indication message sent by the control domain cockpit CDC. Therefore, the following steps may be further performed after S401.

S403. Receive the first indication message.

For the non-vehicle-mounted device, when the first indication message sent by the control domain cockpit CDC is received, for example, the first indication message is the system broadcast message, it is determined, based on the system broadcast message, whether the non-vehicle-mounted device is allowed to access the control domain cockpit CDC. In an example, a device type and an access relationship of the non-vehicle-mounted device may be determined based on the access indication information carried in the system broadcast message, and whether the non-vehicle-mounted device is allowed to access the control domain cockpit CDC is determined based on the device type and the access relationship. Certainly, in another example, if the first indication message sent by the control domain cockpit CDC directly indicates whether the non-vehicle-mounted device is allowed to access the control domain cockpit CDC, based on the information in the first indication message, S207 may be performed if the non-vehicle-mounted device is not allowed to access the control domain cockpit CDC; or S208 may be performed if the non-vehicle-mounted device is allowed to access the control domain cockpit CDC.

S404. Determine whether the access indication information meets a preset condition. It should be noted that this step is optional, and is applied only in a case where the first indication message includes the access indication information. If the first indication message directly indicates whether access is allowed, whether the access indication information meets the preset condition does not need to be determined.

To be specific, the non-vehicle-mounted device determines, based on the device type and the access relationship that are determined in S403, whether the device type of the non-vehicle-mounted device is allowed to initiate the random access request.

In an example, if the device type of the non-vehicle-mounted device does not allow initiation of the random access request, it is determined that the non-vehicle-mounted device is not allowed to access the control domain cockpit CDC, and S207 is performed; or if the device type of the non-vehicle-mounted device allows initiation of the random access request, it is determined that the non-vehicle-mounted device is allowed to access the control domain cockpit CDC, and S208 is performed.

Implementation processes of S207 and S208 are the same as those of S207 and S208 in FIG. 2. For ease of description, details are not described herein again.

In this application, the system broadcast message carries the access indication information, to ensure that only a device whose device type meets a preset condition is allowed to send the random access request, and a device whose device type does not meet the preset condition is prohibited from sending the random access request. This avoids impact, caused by random access request initiation performed by the non-vehicle-mounted device, on checking the status of the vehicle-mounted device by the CDC and access of the vehicle-mounted device. In this way, it is ensured that the vehicle-mounted device can run normally and some basic services can be run normally.

Certainly, a person skilled in the art should note that the time threshold set in FIG. 3 and the access indication information set in FIG. 4 may be used together with the system status determined in FIG. 2. Certainly, any one or two of the time threshold, the access indication information, and the system status may be selected, so that the control domain cockpit CDC can control access of the vehicle-mounted device and the non-vehicle-mounted device.

Figure 5:
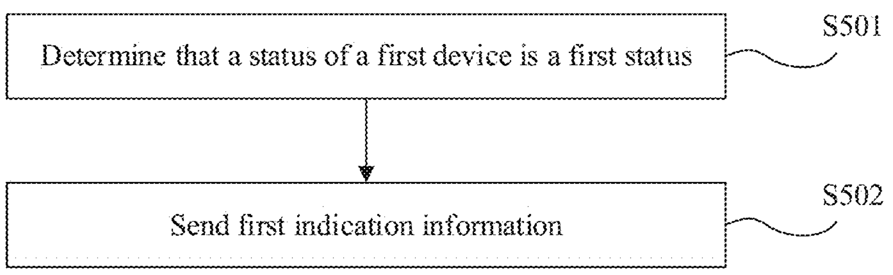
FIG. 5 is a flowchart of an access control method according to an embodiment of this application.

FIG. 5 is a flowchart of an access control method according to an embodiment of this application.

As shown in FIG. 5, this application provides an access control method. The interaction processes in FIG. 2 to FIG. 4 may be implemented by using this method. The method may include the following steps.

S501. Determine that a status of a first device is a first status.

S502. Send first indication information. The first indication information is used to indicate whether access of at least one second device to the first device is allowed. Optionally, the first indication information is carried in a system message or may be sent by broadcasting. For example, the system message may be a system broadcast message. The first indication information may be a MIB, a SIB, or a broadcast frame. The MIB may be carried on a PBCH. The SIB is usually included in RRC signaling.

In a possible implementation, the first status includes at least one of a system preparation state and a vehicle-mounted device accessing state, and the first indication information is used to indicate that access of the at least one second device is not allowed; or the first status includes at least one of a system running state and an access allowed state, and the first indication information is used to indicate that access of the second device is allowed. The system preparation state and/or the vehicle-mounted device accessing state may be used to indicate that a vehicle-mounted device is accessing a control domain cockpit CDC, or the vehicle-mounted device is performing self-check, so that a non-vehicle-mounted device chooses, based on these types of system states, not to access the control domain cockpit CDC. The system running state and/or the access allowed state may be used to indicate that the vehicle-mounted device has accessed the control domain cockpit CDC. In this case, the non-vehicle-mounted device may be allowed to access the control domain cockpit CDC.

In a possible implementation, the first indication information is used to indicate whether access of at least one third device is allowed.

In a possible implementation, the first indication information includes device type information, and a device type of the at least one second device belongs to at least one device type indicated by the device type information. Further, the second device determines, based on the device type information, whether to access the first device.

In a possible implementation, the first indication information further includes access indication information, and the access indication information is used to indicate whether access to the first device is allowed.

In a possible implementation, the first indication information includes priority information, and a priority of the at least one second device belongs to at least one priority indicated by the priority information. The first indication information further includes access indication information, and the access indication information is used to indicate whether access to the first device is allowed. Further, the second device determines, based on the priority information and the access indication information, whether to access the first device.

In a possible implementation, the first indication information includes first time information, and the first time information is used to indicate that the at least one second device is not allowed to access the first device within a first time range.

In a possible implementation, the first time range is a time domain offset relative to a first reference frame or a time domain offset relative to first signaling. The first reference frame may be a first system frame number agreed or negotiated in advance between the control domain cockpit CDC and the non-vehicle-mounted device, or may be a first system frame number defined in protocols. The first signaling may be specific signaling agreed or negotiated in advance between the control domain cockpit CDC and the non-vehicle-mounted device, or may be specific signaling defined in the protocols. For example, the first signaling may be RRC signaling. There may be one or more time domain offsets.

In a possible implementation, the first indication information includes resource indication information, and the resource indication information indicates a resource used for the at least one third device; or the resource indicated by the resource indication information is not used for the at least one second device.

In a possible implementation, there is a correspondence between the resource indicated by the resource indication information and a device type and/or a priority of the at least one third device.

In a possible implementation, the first indication information includes a Boolean variable or an enumeration variable. Certainly, alternatively, a variable of any other equivalent type may be included.

In a possible implementation, the device type includes at least one of vehicle-mounted device and non-vehicle-mounted device.

Figure 6:
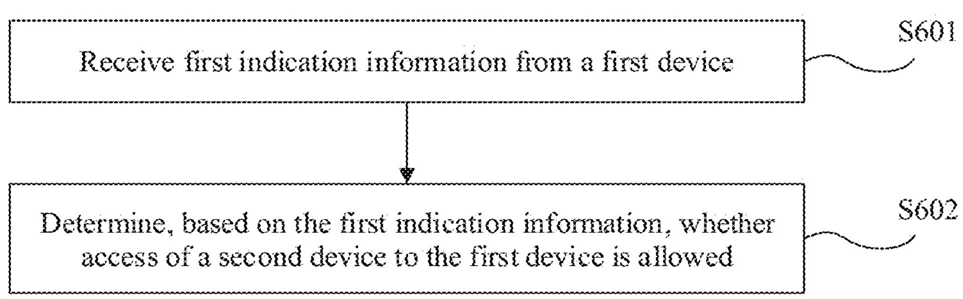
FIG. 6 is a flowchart of another access control method according to an embodiment of this application.

FIG. 6 is a flowchart of another access control method according to an embodiment of this application.

As shown in FIG. 6, this application provides another access control method. The interaction processes in FIG. 2 to FIG. 4 may be implemented by using this method. The method may include the following steps.

S601. Receive first indication information from a first device. Optionally, the first indication information is carried in a system message or is sent by broadcasting. For example, the system message may be a system broadcast message. The first indication information may be a MIB, a SIB, or a broadcast frame. The MIB may be carried on a PBCH. The SIB is usually included in RRC signaling.

S602. Determine, based on the first indication information, whether access of a second device to the first device is allowed.

In a possible implementation, the first indication information is used to indicate whether access of at least one third device is allowed.

In a possible implementation, the first indication information includes device type information, and a device type of at least one second device belongs to at least one device type indicated by the device type information. Further, the second device determines, based on the device type information, whether to access the first device.

In a possible implementation, the first indication information further includes access indication information, and the access indication information is used to indicate whether access to the first device is allowed.

In a possible implementation, the first indication information includes priority information, and a priority of the at least one second device belongs to at least one priority indicated by the priority information. The first indication information further includes access indication information, and the access indication information is used to indicate whether access to the first device is allowed. Further, the second device determines, based on the priority information and the access indication information, whether to access the first device.

In a possible implementation, the first indication information includes first time information, and the first time information is used to indicate that the at least one second device is not allowed to access the first device within a first time range.

In a possible implementation, the first time range is a time domain offset relative to a first reference frame or a time domain offset relative to first signaling. The first reference frame may be a first system frame number agreed or negotiated in advance between a control domain cockpit CDC and a non-vehicle-mounted device, or may be a first system frame number defined in protocols. The first signaling may be specific signaling agreed or negotiated in advance between the control domain cockpit CDC and the non-vehicle-mounted device, or may be specific signaling defined in the protocols. For example, the first signaling may be RRC signaling. There may be one or more time domain offsets. In a possible implementation, the first indication information includes resource indication information, and the resource indication information indicates a resource used for the at least one third device; or the resource indicated by the resource indication information is not used for the at least one second device.

In a possible implementation, there is a correspondence between the resource indicated by the resource indication information and a device type and/or a priority of the at least one third device.

In a possible implementation, the first indication information includes a Boolean variable or an enumeration variable. Certainly, alternatively, a variable of any other equivalent type may be included.

In a possible implementation, the first device is the control domain cockpit CDC, the third device is a vehicle-mounted device, and the second device is the non-vehicle-mounted device.

In a possible implementation, the second device is a mobile phone.

Figure 7:
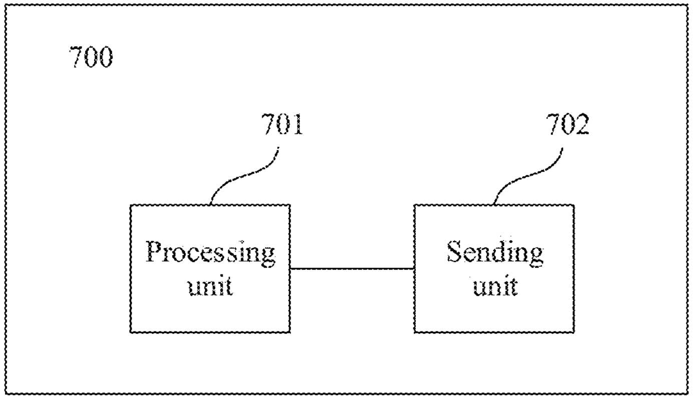
FIG. 7 is a schematic diagram of an access control apparatus according to an embodiment of this application.

FIG. 7 is a schematic diagram of an access control apparatus according to an embodiment of this application.

As shown in FIG. 7, this application provides an access control apparatus 700. The access control apparatus 700 may be a first device, for example, a control domain cockpit CDC, or the access control apparatus may be a chip, an internal component, or the like in the first device. Certainly, the access control apparatus may alternatively be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart home device, and/or a smart city device. A specific type of the first device is not limited in this embodiment of this application.

The access control apparatus 700 may implement interaction processes in FIG. 2 to FIG. 4. The access control apparatus 700 includes: a processing unit 701, configured to determine that a status of the first device is a first status; and a sending unit 702, configured to send first indication information, where the first indication information is used to indicate whether access of at least one second device to the first device is allowed. Optionally, the first indication information is carried in a system message or is sent by broadcasting. The first indication information may be a MIB, a SIB, or a broadcast frame (broadcast frame). The MIB may be carried on a PBCH. The SIB is usually included in RRC signaling. Optionally, the first indication information is sent by broadcasting.

In a possible implementation, the first status includes at least one of a system preparation state and a vehicle-mounted device accessing state, and the first indication information is used to indicate that access of the at least one second device is not allowed; or the first status includes at least one of a system running state and an access allowed state, and the first indication information is used to indicate that access of the second device is allowed. The system preparation state and the vehicle-mounted device accessing state may be used to indicate that a vehicle-mounted device is accessing the control domain cockpit CDC, or the vehicle-mounted device is performing self-check, so that a non-vehicle-mounted device chooses, based on these types of system states, not to access the control domain cockpit CDC. The system running state and the access allowed state may be used to indicate that the vehicle-mounted device has accessed the control domain cockpit CDC. In this case, access of the non-vehicle-mounted device to the control domain cockpit CDC is allowed.

In a possible implementation, the first indication information is used to indicate whether access of at least one third device is allowed.

In a possible implementation, the first indication information includes device type information, and a device type of the at least one second device belongs to at least one device type indicated by the device type information. Further, the second device determines, based on the device type information, whether to access the first device.

In a possible implementation, the first indication information further includes access indication information, and the access indication information is used to indicate whether access to the first device is allowed.

In a possible implementation, the first indication information includes priority information, and a priority of the at least one second device belongs to at least one priority indicated by the priority information. The first indication information further includes access indication information, and the access indication information is used to indicate whether access to the first device is allowed. Further, the second device determines, based on the priority information and the access indication information, whether to access the first device.

In a possible implementation, the first indication information includes first time information, and the first time information is used to indicate that the at least one second device is not allowed to access the first device within a first time range.

In a possible implementation, the first time range is a time domain offset relative to a first reference frame or a time domain offset relative to first signaling. The first reference frame may be a first system frame number agreed or negotiated in advance between the control domain cockpit CDC and the non-vehicle-mounted device, or may be a first system frame number defined in protocols. The first signaling may be specific signaling agreed or negotiated in advance between the control domain cockpit CDC and the non-vehicle-mounted device, or may be specific signaling defined in the protocols. For example, the first signaling may be RRC signaling. There may be one or more time domain offsets.

In a possible implementation, the first indication information includes resource indication information, and the resource indication information indicates a resource used for the at least one third device; or the resource indicated by the resource indication information is not used for the at least one second device.

In a possible implementation, there is a correspondence between the resource indicated by the resource indication information and a device type and/or a priority of the at least one third device.

In a possible implementation, the first indication information includes a Boolean variable or an enumeration variable. Certainly, alternatively, a variable of any other equivalent type may be included.

In a possible implementation, the device type includes at least one of vehicle-mounted device and non-vehicle-mounted device.

Figure 8:
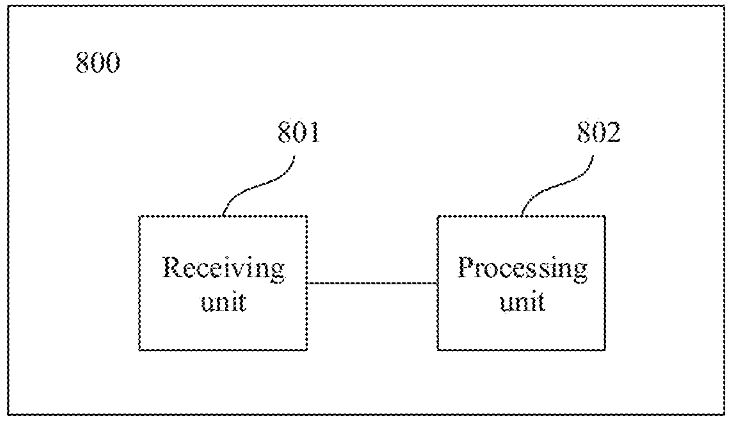
FIG. 8 is a schematic diagram of an access apparatus according to an embodiment of this application.

FIG. 8 is a schematic diagram of an access apparatus according to an embodiment of this application.

As shown in FIG. 8, this application provides an access apparatus 800. The access apparatus 800 may be a second device or a third device, for example, a vehicle-mounted device or a non-vehicle-mounted device, or the access apparatus may be a chip, an internal component, or the like in the second device or the third device, for example, a chip or an internal component in the vehicle-mounted device or the non-vehicle-mounted device. Certainly, the access apparatus may alternatively be a mobile phone, a tablet computer, a desktop computer, a laptop computer, a handheld computer, a notebook computer, a UMPC, a netbook, a cellular phone, a PDA, an AR device, a VR device, an AI device, a wearable device, a vehicle-mounted device, a smart home device, and/or a smart city device. A specific type of a first device is not limited in this embodiment of this application.

The access apparatus 800 may be configured to implement interaction processes in FIG. 2 to FIG. 4. The access apparatus 800 includes a receiving unit 801 and a processing unit 802. The receiving unit 801 is configured to receive first indication information from the first device. The processing unit 802 is configured to determine, based on the first indication information, whether access of the second device to the first device is allowed. Optionally, the first indication information is carried in a system message or may be sent by broadcasting. For example, the system message may be a system broadcast message. The first indication information may be a MIB, a SIB, or a broadcast frame. The MIB may be carried on a PBCH. The SIB is usually included in RRC signaling.

In a possible implementation, the first indication information is used to indicate whether access of at least one third device is allowed.

In a possible implementation, the first indication information includes device type information, and a device type of at least one second device belongs to at least one device type indicated by the device type information. Further, the second device determines, based on the device type information, whether to access the first device.

In a possible implementation, the first indication information further includes access indication information, and the access indication information is used to indicate whether access to the first device is allowed.

In a possible implementation, the first indication information includes priority information, and a priority of the at least one second device belongs to at least one priority indicated by the priority information. The first indication information further includes access indication information, and the access indication information is used to indicate whether access to the first device is allowed. Further, the second device determines, based on the priority information and the access indication information, whether to access the first device.

In a possible implementation, the first indication information includes first time information, and the first time information is used to indicate that access of the at least one second device to the first device is not allowed within a first time range.

In a possible implementation, the first time range is a time domain offset relative to a first reference frame or a time domain offset relative to first signaling. The first reference frame may be a first system frame number agreed or negotiated in advance between the control domain cockpit CDC and the non-vehicle-mounted device, or may be a first system frame number defined in protocols. The first signaling may be specific signaling agreed or negotiated in advance between the control domain cockpit CDC and the non-vehicle-mounted device, or may be specific signaling defined in the protocols. For example, the first signaling may be RRC signaling. There may be one or more time domain offsets.

In a possible implementation, the first indication information includes resource indication information, and the resource indication information indicates a resource used for the at least one third device; or the resource indicated by the resource indication information is not used for the at least one second device.

In a possible implementation, there is a correspondence between the resource indicated by the resource indication information and a device type and/or a priority of the at least one third device.

In a possible implementation, the first indication information includes a Boolean variable or an enumeration variable. Certainly, alternatively, a variable of any other equivalent type may be included.

In a possible implementation, the first device is the control domain cockpit CDC, the third device is the vehicle-mounted device, and the second device is the non-vehicle-mounted device.

In a possible implementation, the second device is a mobile phone.

Figure 9:
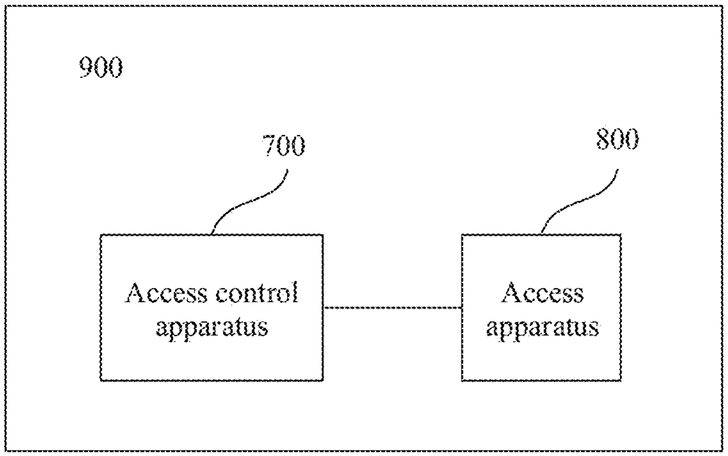
FIG. 9 is a schematic diagram of a communication system according to an embodiment of this application.

FIG. 9 is a schematic diagram of a communication system according to an embodiment of this application.

As shown in FIG. 9, this application provides a communication system 900. The communication system 900 includes the access control apparatus 700 shown in FIG. 7.

The access control apparatus 700 includes at least one processor and a communication interface. Further, the access control apparatus 700 may further include at least one memory. Optionally, the processor, the memory, and the communication interface in the access control apparatus 700 may establish a communication connection through a bus. The communication interface provides information input and/or output for the at least one processor.

The at least one processor may include at least one of a central processing unit (central processing unit, CPU), a graphics processing unit (graphics processing unit, GPU), and a digital signal process (digital signal process, DSP) chip.

The memory may include a volatile memory (volatile memory), such as a random-access memory (random-access memory, RAM); or the memory may further include a non-volatile memory (non-volatile memory), such as a read-only memory (read-only memory, ROM), a flash memory, a hard disk drive (hard disk drive, HDD), or a solid state drive (solid state drive, SSD); or the memory may further include a combination of the foregoing types of memories.

The at least one processor is coupled to the memory, and is configured to read and execute instructions in the memory. When the processor runs, the processor executes the instructions, so that the processor can implement functions of the access control apparatus 700.

In a possible implementation, the access control apparatus 700 may be a chip that can implement the functions in FIG. 7, or a vehicle that can implement the functions in FIG. 7.

In a possible implementation, the communication system 900 further includes the access apparatus 800 shown in FIG. 8.

The access apparatus 800 includes a processor, a memory, a communication interface, and a bus. The processor, the memory, and the communication interface in the access apparatus 800 may establish a communication connection through the bus.

The processor may be a central processing unit (central processing unit, CPU).

The memory may include a volatile memory (volatile memory), such as a random-access memory (random-access memory, RAM); or the memory may further include a non-volatile memory (non-volatile memory), such as a read-only memory (read-only memory, ROM), a flash memory, a hard disk drive (hard disk drive, HDD), or a solid state drive (solid state drive, SSD); or the memory may further include a combination of the foregoing types of memories.

The processor is coupled to the memory, and is configured to read and execute instructions in the memory. When the processor runs, the processor executes the instructions, so that the processor can implement functions of the access apparatus 800.

In a possible implementation, the access apparatus 800 may be a chip that can implement the functions in FIG. 8.

This application further provides a transportation device or an intelligent device, for example, an uncrewed aerial vehicle, a car, an automated guided vehicle, or a robot. The transportation device or the intelligent device includes the foregoing access control apparatus. Further, optionally, the transportation device further includes the foregoing access apparatus.

This application provides an access control method and apparatus, and a communication system. A system broadcast message carrying system status information, a time threshold, and/or access indication information is sent, so that after a non-vehicle-mounted device receives the system broadcast massage, the non-vehicle-mounted device determines, based on the system status information, the time threshold, and/or the access indication information, whether to initiate a random access request. This avoids impact, caused by random access request initiation performed by the non-vehicle-mounted device in this phase, on checking a status of a vehicle-mounted device by a CDC and access of the vehicle-mounted device. In this way, it is ensured that the vehicle-mounted device can run normally and some basic services can be run normally.

A person skilled in the art should be aware that in the foregoing one or more examples, functions described in embodiments of this application may be implemented by hardware, software, firmware, or any combination thereof. When the functions are implemented by software, the functions may be stored in a computer-readable medium or transmitted as one or more instructions or code in a computer-readable medium. The computer-readable medium includes a computer storage medium and a communication medium, where the communication medium includes any medium that facilitates transmission of a computer program from one place to another. The storage medium may be any available medium accessible to a general-purpose computer or a dedicated computer.

Steps of methods or algorithms described in embodiments disclosed in this specification may be implemented by hardware, a software module executed by a processor, or a combination thereof. The software module may be configured in a random access memory (RAM), a memory, a read-only memory (ROM), an electrically programmable ROM, an electrically erasable programmable ROM, a register, a hard disk drive, a removable disk, a CD-ROM, or a storage medium in any other forms well-known in the art.

In the foregoing specific implementations, the objectives, technical solutions, and beneficial effects of this application are further described in detail. It should be understood that the foregoing description is merely specific implementations of this application, but is not intended to limit the protection scope of this application. Any modification, equivalent replacement, improvement, or the like made based on the technical solutions of this application shall fall within the protection scope of this application.

What is claimed is:

1. An access control method, wherein the method comprises:

determining, by a first device, that a status of the first device is a first status, wherein the first device is a vehicle cockpit domain controller (CDC), and the vehicle CDC determines that the status of the first device is the first status; and sending, by the first device, first indication information, wherein the first indication information comprises device type information, the device type information indicates at least one device type from a plurality of device types, the plurality of device types comprise a vehicle-mounted device type and a non-vehicle-mounted device type, and the first indication information indicates whether access of at least one second device to the first device is allowed.

2. The access control method according to claim 1, wherein:

the first status comprises at least one of a system preparation state or a vehicle-mounted device accessing state, and the first indication information indicates that access of the at least one second device is not allowed; or the first status comprises at least one of a system running state or an access allowed state, and the first indication information indicates that access of the at least one second device is allowed.

3. The access control method according to claim 1, wherein the first indication information indicates whether access of at least one third device is allowed.

4. The access control method according to claim 1, wherein a device type of the at least one second device belongs to the at least one device type indicated by the device type information.

5. The access control method according to claim 4, wherein the first indication information further comprises access indication information, and the access indication information indicates whether access to the first device is allowed.

6. An access method, wherein the method comprises:

receiving first indication information from a first device, wherein the first device is a vehicle cockpit domain controller (CDC), the first indication information comprises device type information, the device type information indicates at least one device type from a plurality of device types, and the plurality of device types comprise a vehicle-mounted device type and a non-vehicle-mounted device type; and determining, based on the first indication information, whether access of at least one second device to the first device is allowed.

7. The access method according to claim 6, wherein the first indication information indicates whether access of at least one third device is allowed.

8. The access method according to claim 6, wherein a device type of the at least one second device belongs to the at least one device type indicated by the device type information.

9. The access method according to claim 8, wherein the first indication information further comprises access indication information, and the access indication information indicates whether access to the first device is allowed.

10. The access method according to claim 6, wherein the first indication information comprises access indication information, and the access indication information indicates a mapping relationship between a device type and an access relationship.

11. The access method according to claim 10, wherein the access indication information identifies a device type corresponding to one bit of a bitmap, and the access indication information identifies whether a device of the device type is allowed to access to the first device by using a value of the one bit of the bitmap.

12. The access method according to claim 6, wherein the first indication information comprises priority information, and a priority of the at least one second device belongs to at least one priority indicated by the priority information.

13. The access method according to claim 10 wherein the first indication information further comprises the access indication information, and the access indication information indicates whether access to the first device is allowed.

14. The access method according to claim 6, wherein the first indication information comprises first time information, and the first time information indicates that the at least one second device is not allowed to access the first device within a first time range.

15. An access control apparatus, wherein the access control apparatus comprises:

a transmitter;

at least one processor; and one or more memories coupled to the at least one processor and storing programming instructions for execution by the at least one processor to cause the access control apparatus to:

determine that a status of a first device is a first status, wherein the access control apparatus includes the first device, the first device is a vehicle cockpit domain controller (CDC), and the vehicle CDC determines that the status of the first device is the first status; and send first indication information, wherein the first indication information comprises device type information, the device type information indicates at least one device type from a plurality of device types, the plurality of device types comprise a vehicle-mounted device type and a non-vehicle-mounted device type, and the first indication information indicates whether access of at least one second device to the first device is allowed.

16. The access control apparatus according to claim 15, wherein;

the first status comprises at least one of a system preparation state or a vehicle-mounted device accessing state, and the first indication information indicates that access of the at least one second device is not allowed; or the first status comprises at least one of a system running state or an access allowed state, and the first indication information indicates that access of the second device is allowed.

17. The access control apparatus according to claim 15, wherein the first indication information indicates whether access of at least one third device is allowed.

18. The access control apparatus according to claim 15, wherein a device type of the at least one second device belongs to the at least one device type indicated by the device type information.

19. The access control apparatus according to claim 18, wherein the first indication information further comprises access indication information, and the access indication information indicates whether access to the first device is allowed.

20. An apparatus, wherein the apparatus comprises:

a receiver;

at least one processor; and one or more memories coupled to the at least one processor and storing programming instructions for execution by the at least one processor to cause the apparatus to:

receive first indication information from a first device, wherein the first device is a vehicle cockpit domain controller (CDC), the first indication information comprises device type information, the device type information indicates at least one device type from a plurality of device types, and the plurality of device types comprise a vehicle-mounted device type and non-vehicle-mounted device type; and determine, based on the first indication information, whether access of at least one second device to the first device is allowed.

21. The apparatus according to claim 20, wherein the first indication information indicates whether access of at least one third device is allowed.

22. The apparatus according to claim 20, wherein a device type of the at least one second device belongs to the at least one device type indicated by the device type information.

23. The apparatus according to claim 22, wherein the first indication information further comprises access indication information, and the access indication information indicates whether access to the first device is allowed.

24. The apparatus according to claim 20, wherein the first indication information comprises access indication information, and the access indication information indicates a mapping relationship between a device type and an access relationship.

25. The apparatus according to claim 24, wherein the access indication information identifies a device type corresponding to one bit of a bitmap, and the access indication information identifies whether a device of the device type is allowed to access to the first device by using a value of the one bit of the bitmap.

26. The apparatus according to claim 20 wherein the first indication information comprises priority information, and a priority of the at least one second device belongs to at least one priority indicated by the priority information.

27. The apparatus according to claim 26, wherein the first indication information further comprises access indication information, and the access indication information indicates whether access to the first device is allowed.

28. The apparatus according to claim 20, wherein the first indication information comprises first time information, and the first time information indicates that the at least one second device is not allowed to access the first device within a first time range.

29. The access control method according to claim 1, wherein the at least one second device includes at least one of a mobile phone, a headset, a wearable device, a tablet computer, a notebook computer, a digital camera, a personal digital assistant (PDA), or a laptop computer.

30. The access control method according to claim 1, wherein the at least one second device includes a non-vehicle-mounted device, and the first device and the at least one second device are located in a vehicle.

* * * * *